(12) United States Patent
Newman

(10) Patent No.: US 9,681,111 B1
(45) Date of Patent: Jun. 13, 2017

(54) APPARATUS AND METHODS FOR EMBEDDING METADATA INTO VIDEO STREAM

(71) Applicant: GOPRO, INC., San Mateo, CA (US)

(72) Inventor: David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/920,427

(22) Filed: Oct. 22, 2015

(51) Int. Cl.
*H04N 5/935* (2006.01)
*H04N 5/77* (2006.01)
*H04N 9/82* (2006.01)
*G11B 27/034* (2006.01)
*H04N 19/423* (2014.01)
*H04N 19/70* (2014.01)
*G11B 27/30* (2006.01)

(52) U.S. Cl.
CPC ......... *H04N 9/8205* (2013.01); *G11B 27/034* (2013.01); *G11B 27/3027* (2013.01); *H04N 5/772* (2013.01); *H04N 19/423* (2014.11); *H04N 19/70* (2014.11)

(58) Field of Classification Search
USPC ........................................ 386/210, 223–229
See application file for complete search history.

(56) References Cited

U.S. PATENT DOCUMENTS

| 6,434,265 B1 | 8/2002 | Xiong |
| 6,486,908 B1 | 11/2002 | Chen |
| 6,710,740 B2 | 3/2004 | Needham |
| 6,711,293 B1 | 3/2004 | Lowe |
| 6,788,333 B1 | 9/2004 | Uyttendaele |
| 7,403,224 B2 | 7/2008 | Fuller |
| 7,983,502 B2 | 7/2011 | Cohen |
| 8,411,166 B2 | 4/2013 | Miyata |

(Continued)

FOREIGN PATENT DOCUMENTS

| EP | 0605045 A1 | 7/1994 |
| EP | 0650299 A1 | 4/1995 |
| EP | 0661672 A1 | 7/1995 |

OTHER PUBLICATIONS

Ryan Jackson: 'Shooting 360-degree video with four GoPro HD Hero cameras/Ryan Jackson Photography' Feb. 8, 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014].

(Continued)

*Primary Examiner* — Nigar Chowdhury
(74) *Attorney, Agent, or Firm* — Sheppard Mullin Richter & Hampton LLP

(57) ABSTRACT

Apparatus and methods for combining metadata with video into a video stream using a 32-bit aligned payload, that is computer storage efficient and human discernable. The metadata is stored in a track in a self-describing structure. Metadata track may be decoded using an identifier reference table that is substantially smaller than typical fourCC identifier tables. The combined metadata/video stream is compatible with a standard video stream convention and may be played using conventional media player applications that reads media files compliant with MP4/MOV container format. The proposed format may enable decoding of metadata during streaming, partitioning of combined video stream without loss of metadata. The proposed format and/or metadata protocol provides for temporal synchronization of metadata with video frames.

20 Claims, 15 Drawing Sheets

(56) References Cited

U.S. PATENT DOCUMENTS

| | | |
|---|---|---|
| 8,606,073 B2 | 12/2013 | Woodman |
| 8,670,030 B2 | 3/2014 | Tanaka |
| 8,842,197 B2 | 9/2014 | Singh |
| 8,890,954 B2 | 11/2014 | O'Donnell |
| 8,896,694 B2 | 11/2014 | O'Donnell |
| 9,019,396 B2 | 4/2015 | Kiyoshige |
| 9,342,534 B2 | 5/2016 | Singh |
| 9,473,758 B1 | 10/2016 | Long |
| 9,602,795 B1 | 3/2017 | Matias |
| 2002/0112005 A1 | 8/2002 | Namias |
| 2002/0122113 A1 | 9/2002 | Foote |
| 2002/0191087 A1 | 12/2002 | Hashimoto |
| 2003/0085992 A1 | 5/2003 | Arpa |
| 2004/0021780 A1 | 2/2004 | Kogan |
| 2004/0047606 A1 | 3/2004 | Mikawa |
| 2004/0075738 A1 | 4/2004 | Burke |
| 2004/0135900 A1 | 7/2004 | Pyle |
| 2004/0169724 A1 | 9/2004 | Ekpar |
| 2005/0033760 A1 | 2/2005 | Fuller |
| 2005/0062869 A1 | 3/2005 | Zimmermann |
| 2005/0104976 A1 | 5/2005 | Currans |
| 2005/0134707 A1 | 6/2005 | Perotti |
| 2005/0289111 A1 | 12/2005 | Tribble |
| 2006/0050997 A1 | 3/2006 | Imamura |
| 2007/0030358 A1 | 2/2007 | Aoyama |
| 2007/0120986 A1 | 5/2007 | Nunomaki |
| 2007/0140662 A1 | 6/2007 | Nunomaki |
| 2008/0094499 A1 | 4/2008 | Ueno |
| 2008/0118100 A1 | 5/2008 | Hayashi |
| 2009/0251558 A1 | 10/2009 | Park |
| 2009/0262206 A1 | 10/2009 | Park |
| 2010/0045773 A1 | 2/2010 | Ritchey |
| 2010/0097443 A1 | 4/2010 | Lablans |
| 2010/0238304 A1 | 9/2010 | Miyata |
| 2010/0289924 A1 | 11/2010 | Koshikawa |
| 2010/0299630 A1 | 11/2010 | McCutchen |
| 2011/0115883 A1 | 5/2011 | Kellerman |
| 2011/0141300 A1 | 6/2011 | Stec |
| 2011/0261227 A1 | 10/2011 | Higaki |
| 2012/0206565 A1 | 8/2012 | Villmer |
| 2012/0242798 A1 | 9/2012 | Mcardle |
| 2013/0058619 A1 | 3/2013 | Miyakawa |
| 2013/0127903 A1 | 5/2013 | Paris |
| 2013/0176403 A1 | 7/2013 | Varga |
| 2013/0182177 A1 | 7/2013 | Furlan |
| 2013/0210563 A1 | 8/2013 | Hollinger |
| 2013/0235226 A1 | 9/2013 | Karn |
| 2014/0037268 A1 | 2/2014 | Shoji |
| 2014/0240122 A1 | 8/2014 | Roberts |
| 2015/0055937 A1 | 2/2015 | Van Hoff |
| 2015/0186073 A1 | 7/2015 | Pacurariu |
| 2015/0189221 A1 | 7/2015 | Nakase |
| 2015/0287435 A1 | 10/2015 | Land |
| 2016/0005435 A1 | 1/2016 | Campbell |
| 2016/0112713 A1 | 4/2016 | Russell |
| 2016/0234438 A1 | 8/2016 | Satoh |
| 2016/0239340 A1 | 8/2016 | Chauvet |
| 2016/0269621 A1 | 9/2016 | Cho |
| 2016/0313734 A1 | 10/2016 | Enke |
| 2016/0366290 A1 | 12/2016 | Hoshino |

OTHER PUBLICATIONS

PCT International Search Report for PCT/EP2014/061897 dated Sep. 15, 2014.

Mai Zheng et al: "Stitching Video from Webcams", Dec. 1, 2008 (Dec. 1, 2008), Advances in Visual Computing: 4TH International Symposium, ISVC 2008, Las Vegas, NV, USA, Dec. 1-3, 2008. Proceedings, Part II, Springer Berlin Heidelberg, Berlin, Heidelberg, pp. 420-429, XP019112243, ISBN: 978-3-540-89645-6 le document en entier.

PCT International Search Report for PCT/EP2014/058008 dated May 26, 2014.

Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2, 2000, Piscataway, NJ, USA, IEEE, US, vol. 3, Jul. 30, 2000 (Jul. 30, 2000), pp. 1419-1422, XP010512772, DOI: 10.1109/ICME.2000.871033 ISBN: 978-0-7803-6536-0.

Hossein Afshari et al: "The Panoptic Camera: A Plenoptic Sensor with Real-Time Omnidirectional Capability", Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.

Benjamin Meyer et al: "Real-time Free-Viewpoint Navigation from Compressed Multi-Video Recordings", Proc. 3D Data Processing, Visualization and Transmission (3DPVT), May 31, 2010 (May 31, 2010), pp. 1-6, XP055091261, Extrait de l'Internet: URL:http://www.cg.cs.tu-bs.de/media/publications/meyer2010realtime.pdf [extrait le Dec. 3, 2013].

Felix Klose et al: "Stereoscopic 3D View Synthesis From Unsynchronized Multi-View Video", Proc. European Signal Processing Conference (EUSIPCO), Barcelona, Spain, Sep. 2, 2011 (Sep. 2, 2011), pp. 1904-1909, XP055091259, Extrait de l'Internet: URL:http://www.cg.cs.tu-bs.de/media/publications/eusipco2011_3d_synth.pdf [extrait le Dec. 3, 2013].

PCT International Search Report for PCT/EP2014/057352 dated Jun. 27, 2014.

Farin et al., "Shortest Circular Paths on Planar Graphs," in 27th Symposium on Information Theory in the Benelux 2006, 8 pgs.

Zhi et al., "Toward Dynamic Image Mosaic Generation With Robustness to Parallax," IEEE Transactions on Image Processing, vol. 21, No. 1, Jan. 2012, pp. 366-378.

Perazzi et al., "Panoramic Video from Unstructured Camera Arrays," Eurographics, vol. 34 (2015), No. 2, 12 pgs.

Lipski, C.: "Virtual video camera", SIGGRAPH '09: Posters on, SIGGRAPH '09, vol. 0, Jan. 1, 2009 (Jan. 1, 2009), pp. 1-1, XP055091257, New York, New York, USA DOI: 10.1145/1599301.1599394.

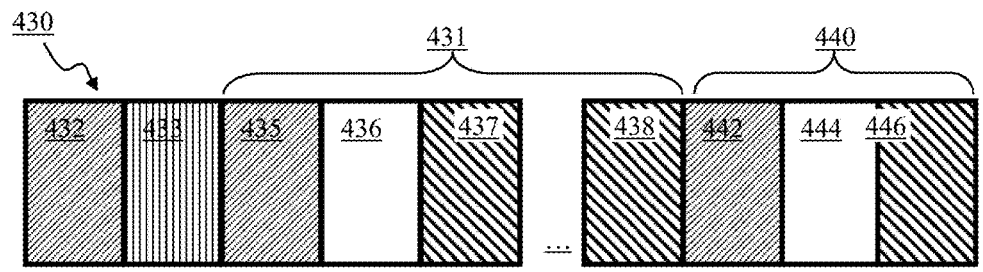
FIG. 4C
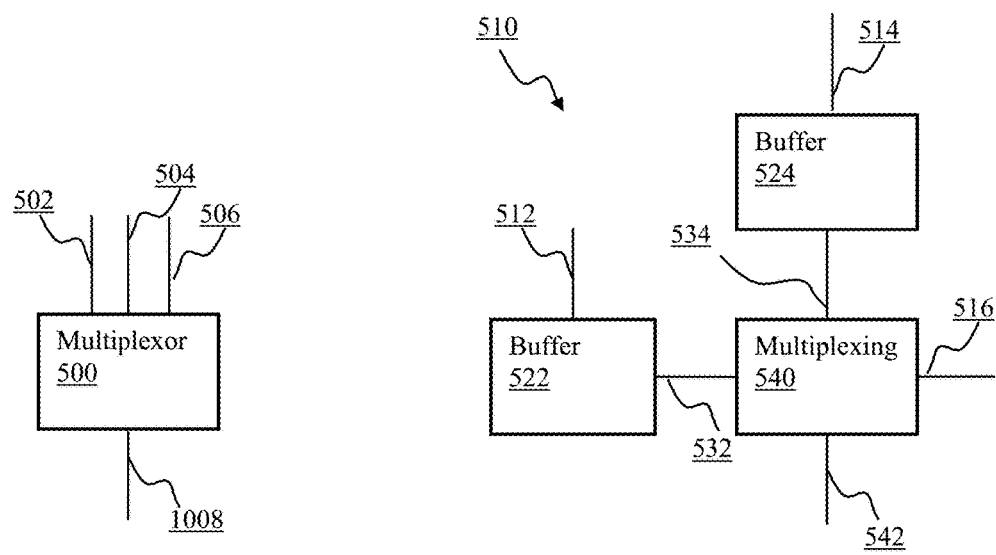
FIG. 5A
FIG. 5B

| | | | | | |
|---|---|---|---|---|---|
| DEVC | 0 | 1 | nest size | | DEVC using the 0 type to indicate nesting |
| DVID | 'L' | 4 | 1 | 32-bit ID | DVID is unique, set by the camera service* |
| DVNM | 'c' | 1 | 10 | "XYZ OBD-II" | Example device is sending car telemetry |
| STRM | 0 | 1 | nest size | | First stream of sensor data for this device |
| UNIT | 'c' | 1 | 3 | "RPM" | Stream of RPM units (for each sample) |
| redl | 'S' | 2 | 1 | 6500 | Device sent engine redline with a new Key |
| RPMs | 'S' | 2 | 6 | 4520, 4510, ... | RAW sample data for engine RPMs |
| STRM | 0 | 1 | nest size | | Second stream of data for this device |
| BRAK | 'f' | 4 | 6 | 0.0, 0.1, ... | RAW sample data for brake pressure |

FIG. 11

```
00000000  44 45 56 43 00 01 01 44-44 56 49 44 4C 04 00 01  DEVC...DDVIDL...
00000010  00 00 00 05 44 56 4E 4D-63 01 00 0F 64 65 76 69  ....DVNMc...devi
00000020  63 65 2D 61 74 74 69 74-75 64 65 00 41 54 54 44  ce-attitude.ATTD
00000030  42 1C 00 0A 00 51 01 00-00 00 00 80 00 00 00 00  B....Q..........
00000040  08 98 44 BE 00 00 00 00-00 00 00 00 00 00 00 00  ..D.............
00000050  E4 51 01 00 00 00 00 80-00 00 00 00 08 98 44 BE  .Q............D.
00000060  00 00 00 00 00 00 00 00-00 00 00 00 44 52 01 00  ............DR..
00000070  00 00 00 80 00 00 00 00-08 98 44 BE 00 00 00 00  ..........D.....
00000080  00 00 00 00 00 00 00 00-AC 53 01 00 00 00 00 80  .........S......
00000090  00 00 00 00 08 98 44 BE-00 00 00 00 00 00 00 00  ......D.........
000000A0  00 00 00 00 10 53 01 00-00 00 00 80 00 00 00 00  .....S..........
000000B0  08 98 44 BE 00 00 00 00-00 00 00 00 00 00 00 00  ..D.............
000000C0  74 53 01 00 00 00 00 80-00 00 00 00 08 98 44 BE  tS............D.
000000D0  00 00 00 00 00 00 00 00-00 00 00 00 D8 53 01 00  .............S..
000000E0  00 00 00 00 00 00 00 00-08 98 44 BE 00 00 00 00  ..........D.....
000000F0  00 00 00 00 00 00 00 00-3C 54 01 00 00 00 00 80  ........<T......
00000100  00 00 00 00 08 98 44 BE-00 00 00 00 00 00 00 00  ......D.........
00000110  00 00 00 00 9E 54 01 00-00 00 00 80 00 00 00 00  .....T..........
00000120  08 98 44 BE 00 00 00 00-00 00 00 00 00 00 00 00  ..D.............
00000130  08 55 01 00 00 00 00 80-00 00 00 00 08 98 44 BE  .U............D.
00000140  00 00 00 00 00 00 00 00-00 00 00                 ...........
```

FIG. 12

| Pay load no. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | ... | 32 |
|---|---|---|---|---|---|---|---|---|---|---|---|---|---|---|---|---|---|---|---|---|---|---|---|---|---|---|---|---|
| GPS Samples | 0 | 0 | 0 | 0 | 4 | 10 | 11 | 10 | 10 | 10 | 11 | 10 | 10 | 3 | 0 | 0 | 0 | 7 | 10 | 10 | 10 | 11 | 10 | 11 | 10 | 10 | ... | 10 |
| result | no lock | | | | | locked GPS sample rate (clock) can be extracted | | | | | | | | no lock (tunnel) | | | | | locked GPS sample rate can be extracted | | | | | | | | | |

FIG. 13

APPARATUS AND METHODS FOR EMBEDDING METADATA INTO VIDEO STREAM

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates generally to capturing and storing of video content and more particularly in one exemplary aspect to computer apparatus and methods for storing data beyond the video and audio captured by the camera.

Description of Related Art

Metadata may be obtained when recording a video stream by a camera. The term metadata may typically refer to information associated with the camera and/or video and/or audio data captured by the camera. The metadata may originate from a variety of sources such as the camera (e.g., GoPro HERO 4), a software application (GoPro mobile device application), device external to camera (e.g., heart rate sensor) and/or other sources. Some existing implementations provide for storing metadata in a separate file, and/or utilizing proprietary formats, four character code (four CC) databases, and/or human readable notations (e.g., JavaScript Object Notation (JSON), XML, and/or other notation). While offering readability to humans, JSON, XML notations may be cumbersome to implement, particularly by memory restricted embedded devices, e.g., such as action cameras. Storing metadata in a separate packed file may prevent from being able to stream metadata contemporaneously with the video data. It may be desirable to combine the metadata with the video/audio data to produce a combined multimedia stream using a format that provides for efficient storage and/or decoding by a computer and human readability.

SUMMARY

The present disclosure satisfies the foregoing needs by providing, inter alia, apparatus and methods for embedding metadata into one or more commonly used video storage format. In one aspect of the disclosure, a computerized capture system is provided for obtaining a multimedia streaming file. The system may include one or more of an imaging sensor, a sensor interface, a sensor other than the imaging sensor, information storage, a processor, and/or other components. The imaging sensor may be configured to generate output signals conveying a series of images. The sensor interface may be configured to obtain information from the sensor other than the imaging sensor. The obtained information may be relevant to one or more images within the series of images. In some implementations, the obtained information may include a parameter that characterizes the image sensor during the generation of the series of images. The parameter may include, by way of non-limiting example, one or more of white balance, imaging sensor temperature, shutter speed, contrast parameter, imaging sensor gain, and/or saturation.

The information storage may be configured to store a collection of potential sensor tags. The sensor tags may include four character tag configured to be case sensitive. The type portion of the sensor tag may include a case sensitive character. The case sensitive character may include, by way of non-limiting example, one or more of 'f', 's', 'c', 'l', 'b', 'B', 'F', 'h', and/or 'L'.

The processor may be configured to generate an encoded video track that includes images from the series of images. The processor may be configured to generate a sensor track that includes a first sensor record containing the obtained information. The processor may be configured to generate a combined multimedia stream that includes the encoded video track and the sensor track. The combined multimedia stream may be configured in accordance with a multimedia container format that includes a video track and a text track. The encoded video track may be stored in the video track and the sensor track may be stored in the text track. The multimedia container format may include, by way of non-limiting example, the QuickTime multimedia container format and/or MPEG-4 Part 14 (MP4) digital multimedia format. The processor may be configured to store the combined multimedia stream in the information storage.

The first sensor record may include a header portion with a 32 bit tag field. The 32 bit tag field may include a sensor tag selected from the collection of potential sensor tags, and the sensor tag may identify the type of the obtained information.

The first sensor record may include a 32 bit type size field. The 32 bit type size field may include an 8 bit value type field. The 8 bit value type field may identify the value type of a given value of the obtained information within the first sensor record.

The 32 bit type size field may include an 8 bit item size field. The 8 bit item size field may indicate the size of a given value of the obtained information within the first sensor record.

The 32 bit type size field may include a 16 bit repeat field. The 16 bit repeat field may indicate the number of values of the obtained information within the first sensor record. In some implementations, the series of images may include a first portion and a second portion, where the first portion corresponds to a first time window and the second portion corresponds to a second time window. The first time window may be configured subsequent to and non-overlapping/spaced from the second time window. The individual number values of the obtained information within the first sensor record may correspond temporally to one or more images within the first portion of the series of images. The sensor track may include a second sensor record, and the individual number values of the obtained information within the second sensor record may correspond temporally to one or more images within the second portion of the series of images.

The first sensor record may include a data portion. The data portion may include the values of the obtained information. The individual values of the obtained information may correspond temporally to the specific one or more images within the series of images.

In some implementations, the track format of the sensor track may be characterized by the cooperation of the descriptions of the header portion including the 32-bit type size field and the data portion. The track format may be configured to enable accessing of the sensor track with the second time window based on reading the second portion of the series of images within the combined multimedia stream.

This accessing may be enabled without reading the first portion of the series of images within the combined multimedia stream.

In some implementations, the computerized capture system may include a communications interface. The first sensor record may include first sensor information portion that characterizes at least one aspect of the imaging sensor within the first time window. The second sensor record may include second sensor information portion that characterizes at least one aspect of the imaging sensor within the second time window. The communications interface may be configured to enable communication of a first portion of the combined multimedia stream. The first portion of the combined multimedia stream may include the first sensor record and the first portion of the series of images. Communicating the first portion of the combined multimedia stream without communicating the second portion of the combined multimedia stream may provide information related to at least one aspect of the imaging sensor during the first time window. The aspect of the imaging sensor may include, by way of non-limiting example, one or more of the imaging sensor motion, the imaging sensor orientation, and the imaging sensor position.

In some implementations, a housing may be configured to enclose the processor and the information storage. The sensor interface may include a wireless communications interface. The wireless communications interface may be configured to receive data communication from a sensor disposed external to the housing, and the data communication may be configured to convey the obtained information.

In some implementations, a sensor may be coupled to the sensor interface. The sensor may be configured to provide the obtained information, including one or more of the imaging sensor motion, the imaging sensor orientation, and the imaging sensor position. In some implementations, a housing may be configured to enclose the processor, the information storage, and the sensor. In some implementations, the sensor may include a gyroscope and the header portion may include a four character code "GYRO." In some implementations, the sensor may include an accelerometer and the header portion may include a four character code "ACCL." In some implementations, the sensor may include a six axis inertial measurement unit and the header portion may include a four character code "IMU6." In some implementations, the sensor may include a 9-axis inertial measurement unit and the header portion may include a four character code "IMU9." In some implementations, the sensor may include a magnetic field sensor and the header portion may include a four character code "MAGN."

In some implementations, a non-transitory computer readable medium may include computer instructions. The computer instructions may be configured to, when executed by a processor, decode sensor information from a multimedia stream. The processor may access one or more image frames from a video track of the multimedia stream, with one of more frames corresponding to a time interval. The processor may access a text track of the multimedia stream corresponding to the time interval.

To access the text track of the multimedia stream, the processor may read from the text track a 32-bit sensor tag field value. The processor may access a data store configured to store multiple sensor tags. The processor may identify within the data store an entry corresponding to the sensor tag field value. The entry may be configured to identify, by way of non-limiting example, one or more of type, origin, and/or meaning of the sensor information. The processor may read from the text track a 32 bit type size field that includes a 8 bit type portion, 8 bit item size field, and 16 bit repeat field. The 8 bit type portion may be configured to identify the type of a given value of the sensor information within a sensor record. The 8 bit item size field may indicate the size of the given value of the sensor information. The 16 bit repeat field may indicate the number of values of the sensor information within the sensor record. The processor may read from a data portion that includes the number of values of the sensor information. The individual number values of the sensor information may correspond temporally to one or more images. The sensor tag field, the type size field, and the data portion may be configured to form the sensor record, and the sensor record may be stored in the text track.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4C is a functional block diagram illustrating nesting of metadata using the methodology of the disclosure, in accordance with one or more implementations.

FIG. 5A is a functional block diagram illustrating one implementation of multiplexor component for use in, e.g., capture device 130 of FIG. 1B.

FIG. 5B is a functional block diagram illustrating one implementation of multiplexor component comprising buffers for use with, e.g., capture device 130 of FIG. 1B.

FIG. 11 is a table illustrating an exemplary metadata record, in accordance with one or more implementations.

FIG. 12 is a table providing an example of metadata record configured using nesting, in accordance with some implementations.

FIG. 13 is a table presenting an example of a 32 second capture, in accordance with some implementations.

Figure 1A:
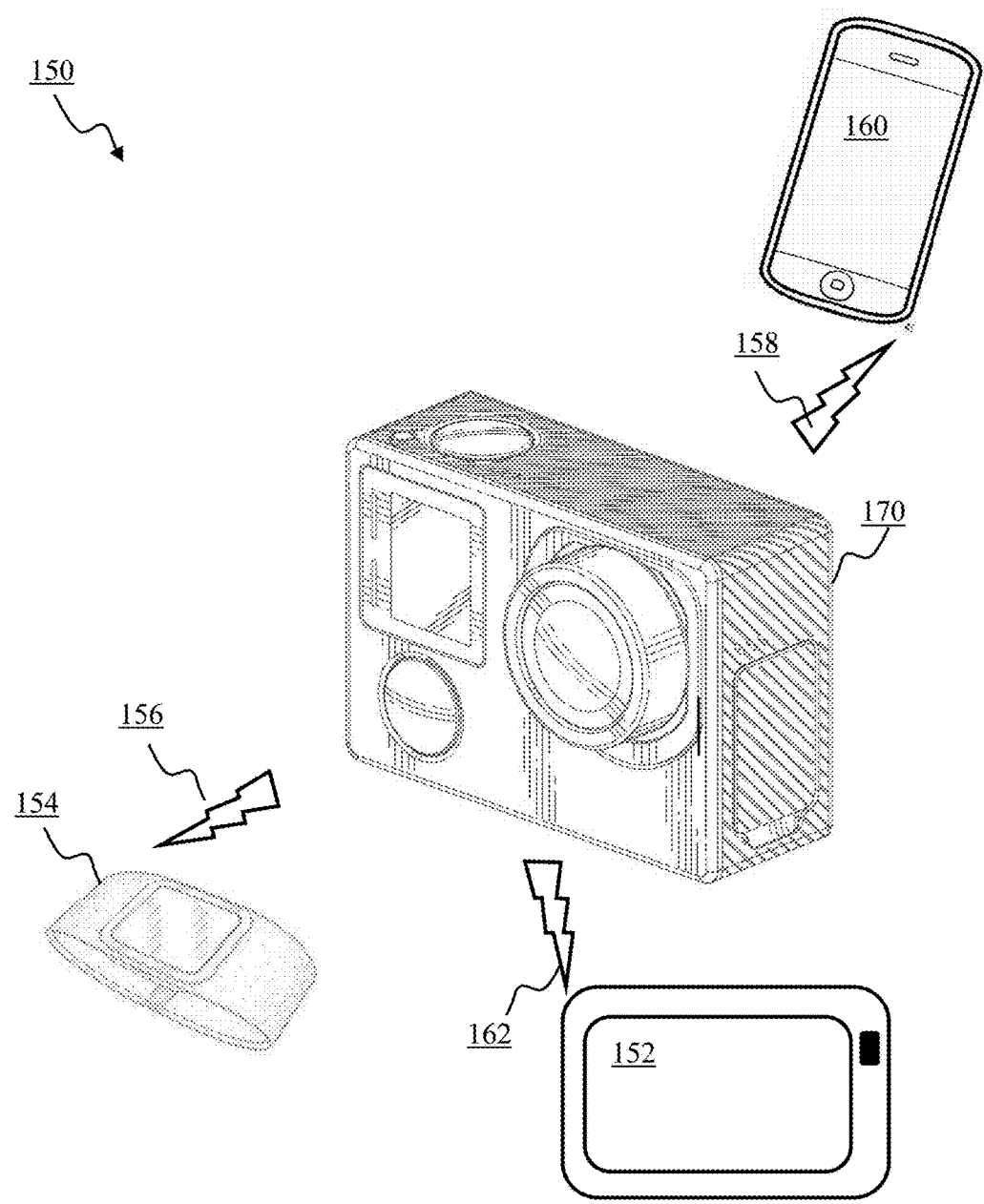
FIG. 1A is a functional block diagram illustrating a GoPro camera interfaced to metadata sources, in accordance with one implementation.

All Figures disclosed herein are © Copyright 2015 GoPro Inc., All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementation, but other implementations and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present invention will be described, and detailed descriptions of other portions of such known components will be omitted so as not to obscure the disclosure.

In the present specification, an implementation showing a singular component should not be considered limiting; rather, the invention is intended to encompass other implementations including a plurality of the same component, and vice-versa, unless explicitly stated otherwise herein.

Further, the present disclosure encompasses present and future known equivalents to the components referred to herein by way of illustration.

Capture devices, such as action video cameras (e.g., GoPro HERO4) may be used in a variety of application where collecting data other than the video track may be of use. The non-video information (also referred to as the metadata) may include e.g., camera orientation, camera location, camera motion, time of day, season, ambient light conditions, weather parameters (e.g., wind speed, direction, humidity), user activity (e.g. running, biking, surfing), image acquisition parameters (e.g., white balance, gain), user statistics (heart rate, age, cycling cadence), Highlight Tags, image acquisition settings (e.g., white balance, field of view, gain, lens aperture, tonality curve) used to obtain an image, exposure time, exposure compensation, and/or other image acquisition parameters, device and/or shot identification (ID) used in, e.g., multi-camera arrays, and/or practically any parameter that may be measured and/or recorded during video acquisition. The metadata may be provided by one or more internal camera components and/or external components, e.g., as shown and described in detail with respect to FIGS. 1A-1B, below. Various sources of information may be utilized with the methodology of the present disclosure, including but not limited to telemetry pucks, vehicle telemetry information (e.g., brake pressure, engine RPM, vehicle speed, altitude, on board diagnostics parameters, and/or other vehicle parameters), information related to other capture devices that may occur in a vicinity (e.g., Bluetooth proximity information, radio frequency signal strength, ID of a neighboring capture device, etc.).

When acquiring video, e.g., using an action camera device such as GoPro HERO3, HERO4, it may be of benefit to record, stream, and/or store additional information that may be related to the video acquisition session. In some implementations, such information may include camera sensor image acquisition parameters (e.g., exposure, white balance, gain), camera orientation, camera location, camera motion, time of day, season, ambient light conditions, audio information, evaluation of activity being filmed (e.g., surfing, biking), ambient temperature, user body parameters (e.g., heart rate, cadence) and/or any other parameter that may be conceivably related to the activity being filmed.

Table 1 lists exemplary metadata sources and use of their information, in accordance with one or more implementations.

TABLE 1

| source | use cases |
|---|---|
| IQ-Exposure/White Balance/Shutter interval | Stitching of multiple camera video frames (e.g., 360 coverage), automatic de-noising, 3D calibration, determination of parameters for smart video editing (SVE) |
| Audio | Microphone wind noise detection; 360 steerable stereo, Protune audio |
| Highlight | Storing of user generated and automatically generated highlight tags identifying moment of interest in captured content |
| Sensor temperature | automatic de-noising, in field support |
| Accelerometer, Gyro, Magnetometer | Electronic image stabilization (EIS), auto orientation in 360 video, collaborative editing (does my camera see you), Egomotion |
| Position | Use in overlays for quick previews |

FIG. 1A illustrates a system comprising GoPro camera apparatus interfaced to metadata sources, in accordance with one implementation. The camera apparatus 170 of the system 150 may include one or more GoPro action cameras, e.g., HERO4 Silver. The camera apparatus 170 may house one or more internal metadata sources, e.g., video processor (also referred to as sensor controller 220 in FIG. 2A), inertial measurement unit (244 in FIG. 2A), global positioning system (GPS) receiver component (not shown) and/or other metadata source.

The camera apparatus 170 may be interfaced to an external heartrate monitor device 154 via wireless link 156 and to an external device 152 (comprising e.g., GPS receiver, cycling computer, and/or other device) via wireless link 162. Individual links 156, 162 may utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations (not shown) one or more external metadata devices may interface to the apparatus 170 via a wired link, e.g., HDMI, USB, coaxial audio, and/or other interface.

In one or more implementations, the camera apparatus 170 may house one or more sensors (e.g., GPS, pressure, temperature, heart rate, and/or other sensors). The metadata obtained by the camera apparatus 170 may be incorporated into the combined multimedia stream using any applicable methodologies including those described herein.

The camera apparatus 170 interface to an external user interface device 160 via link 158. In some implementations, link 156, 158 may correspond to a wireless interface, e.g., WiFi, Bluetooth (BT), cellular data link, and/or other wireless communications link. In some implementations the link 158 may include a wired interface, e.g., HDMI, USB, digital video interface, display port interface (e.g., digital display interface developed by the Video Electronics Standards Association (VESA), Ethernet, Thunderbolt, and/or other interface. In some implementations, the device 160 may correspond to a smartphone, a tablet computer, a phablet, a smart watch, a portable computer, and/or other device configured to receive user input and communicate information with the camera apparatus 170.

The user interface device 160 may operate a software application (e.g., GoPro Studio, GoPro App, and/or other application) configured to perform a variety of operations related to camera configuration, control of video acquisition, and/or display of video captured by the camera apparatus 170. An application (e.g., GoPro App) may a user to create short video clips and share them to Instagram, Facebook, YouTube, Dropbox, perform full remote control of camera 170 functions, live preview video being captured for shot framing, mark key moments while recording with HiLight Tag, View HiLight Tags in GoPro Camera Roll for location and/or playback of video highlights, wirelessly your camera software, and/or perform other functions. Various methodologies may be utilized for configuring the camera apparatus 170 and/or displaying the captured information including these described in U.S. Pat. No. 8,606,073, entitled "BROADCAST MANAGEMENT SYSTEM", issued Dec. 10, 2013, the foregoing being incorporated herein by reference in its entirety.

By way of an illustration, the device 160 may receive user setting characterizing image resolution (e.g., 3840 pixels by 2160 pixels), frame rate (e.g., 60 frames per second (fps)), and/or other settings (e.g., location) related to the activity (e.g., surfing) being capture. The user interface device 160 may communicate the settings to the camera apparatus 170.

In some implementation, the user interface device 160 may communicate additional information (metadata) to the camera apparatus 170. By way of an illustration, the device 160 may provide location, speed, environmental information (e.g., weather conditions, temperature), and/or other information for use with presentation of the video being captured by the camera apparatus 170.

The user interface device 160 may be configured to receive (e.g., via the link 158) information related to the video being captured by the camera 170. In some implementations, the information may comprise full resolution (e.g., 3840 pixels by 2160 pixels at 60 fps) video stream, lower-resolution (e.g., 1280×720 pixels) and/or lower frame rate (e.g., 30 fps) video stream, video duration (e.g., elapsed recoding time), metadata (e.g., heart rate provided by the device 154), and/or other information. The user interface device 160 may provide metadata (e.g., position and/or speed provided by the device 160 GPS receiver) for use (e.g., overlay display) with the received video and/or incorporation into a multimedia stream.

Figure 1B:
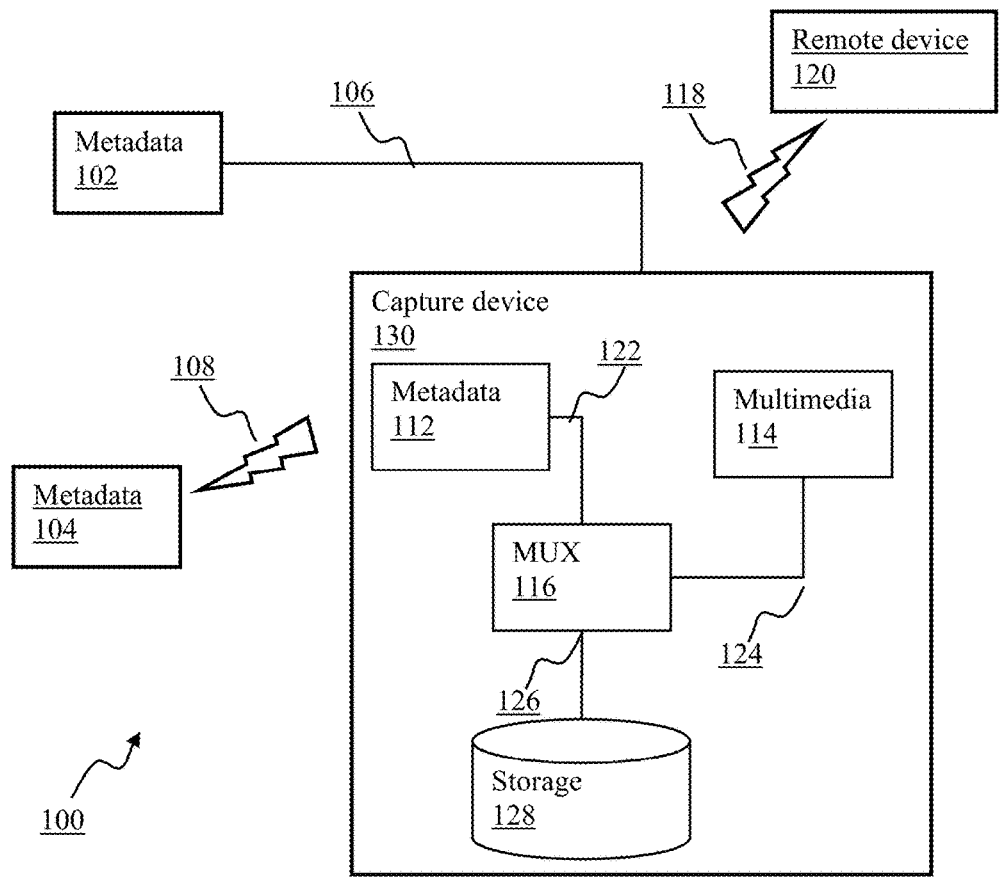
FIG. 1B is a functional block diagram illustrating a system for metadata and video acquisition in accordance with one implementation.
Figure 1C:
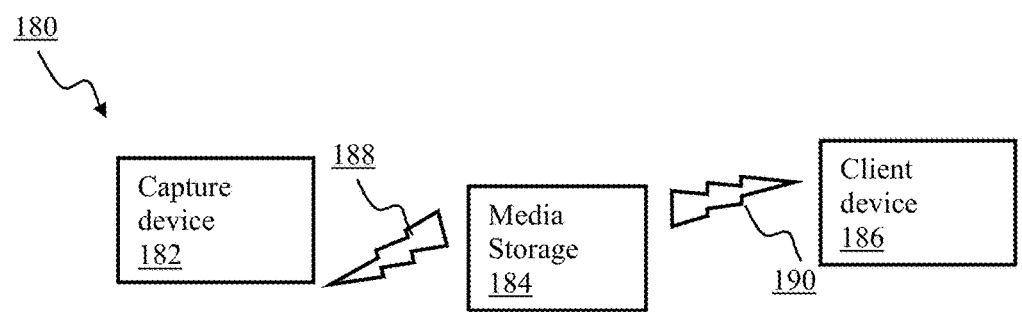
FIG. 1C is a functional block diagram illustrating a generalized system for capturing multimedia in accordance with one implementation.

Exemplary configuration of FIGS. 1A-1C may provide for a simple, extensible system for capturing, storing, streaming, retrieving and using metadata across the span of GoPro products and to be open and easily accessible wherever GoPro media is used.

FIG. 1B illustrates a system for metadata and video acquisition in accordance with one implementation. The system 100 may include a capture device 130 in operable communication with metadata sources 102, 104 via links 106, 108 respectively. In some implementations, the capture device 130 may encompass an action camera (e.g., the camera 160 described with respect to FIG. 1A) and/or other camera device. The capture device 130 may include a multimedia processing component 114 in FIG. 1A and/or 220 in FIG. 2A, configured to produce a multimedia stream (denoted by pathway 124 in FIG. 1B) consisting of a video track and/or audio track. The video track may consist of multiple frames of pixels using any applicable encoding method (e.g., H262, H.264, Cineform and/or other standard). In some implementations, the video processing component may include a digital processor, such as described in detail with respect to FIG. 2A below. The component 114 may be configured to provide metadata track associated with the video track and/or audio track. In some implementations, the metadata output of the component 114 may include but not limited to white balance, image sensor gain, sensor temperature, exposure time, lens aperture, bracketing configuration (e.g., image exposure bracketing, aperture bracketing, focus bracketing), and/or other parameters. Information from one or more metadata sources (e.g., 102, 104, 112, 114 in FIG. 1B) may be combined with the video and/or audio tracks by multiplexor component 116, described in detail with respect to FIGS. 5A-5B.

FIG. 5A illustrates one implementation of multiplexor component for use in, e.g., capture device 130 of FIG. 1B. The multiplexor component 500 may be configured to receive one or more metadata streams (e.g., 502, 504 in FIG. 5A). The multiplexor 500 may receive a multimedia stream 506. In some implementations, the stream 506 may comprise video track, e.g., track 310 shown and described with respect to FIG. 3 below. In some implementations, the stream 506 may comprise an audio track, encoded e.g., using AAC, AC3, MP3, linear PCM, MPEG-H and or other audio coding format (audio codec). In one or more implementations of spherical video and/or audio, the audio codec may comprise a 3-dimensional audio codec, e.g., Ambisonics such as described at http://www.ambisonic.net/ and/or http://www-.digitalbrainstorming.ch/db_data/eve/ambisonics/text01.pdf, the foregoing being incorporated herein by reference in its entirety.

The multiplexor component 500 may be operable to produce a multiplexed stream 508 comprising video and/or audio track, and one or more metadata track. In some implementations, the stream 508 may correspond to information stream 300 described with respect to FIG. 3. The metadata track portion of the stream 508 may correspond to metadata records described with respect to FIGS. 4A-4C.

FIG. 5B illustrates an implementation of metadata multiplexor apparatus comprising a buffer for use with, e.g., capture device 130 of FIG. 1B. In some capture applications, audio and/or video information provided by, e.g., multimedia component 114 of the capture device 130 of FIG. 1B and/or component 220 and metadata (e.g., provided by a GPS receiver, a temperature sensor, heart rate sensor, an IMU and/or another metadata source) may be characterized by different timing (e.g., sampling interval, time of sample occurrence, number of samples). Buffering may be utilized in order to temporally match individual information streams (e.g., video and motion information in some implementation). The multiplexor apparatus 510 may comprise one or more buffers (e.g., buffers 522, 524 shown in FIG. 5B). Buffers 522, 524 may be configured to store one or more samples of metadata streams 512, 514, respectively. In some implementations, the streams 512, 514 may correspond to metadata provided by one or more internal and/or external sensors, e.g., GPS, temperature, position, motion, user statistics and/or other sensors. In one or more implementations, the video stream 516 may be buffered by a video buffer (not shown in FIG. 5B).

Buffered streams 532, 534 may be provided to multiplexing logic component 540. In one or more implementations, the logic component 540 may receive output of video encoder, e.g., video stream denoted 516 in FIG. 5B. In some implementation, the logic component may be effectuated by operating computer executable code (e.g., software application, firmware code), programmable logic (e.g., FPGA), ASIC, and or other methodology. The logic component 540 may be operable to perform temporal alignment and/or multiplexing of streams 532, 534, 516 using methodology of the disclosure (e.g., such as described with respect to FIGS. 4A-4C below. Output 542 of the apparatus 510 may comprise multiplexed multimedia/metadata configured for streaming applications.

In some implementations, multiplexor component 500 and/or apparatus 510 may be embodied within a capture device (e.g., corresponding to the component 116 of the device 130 of FIG. 1B).

Figure 2A:
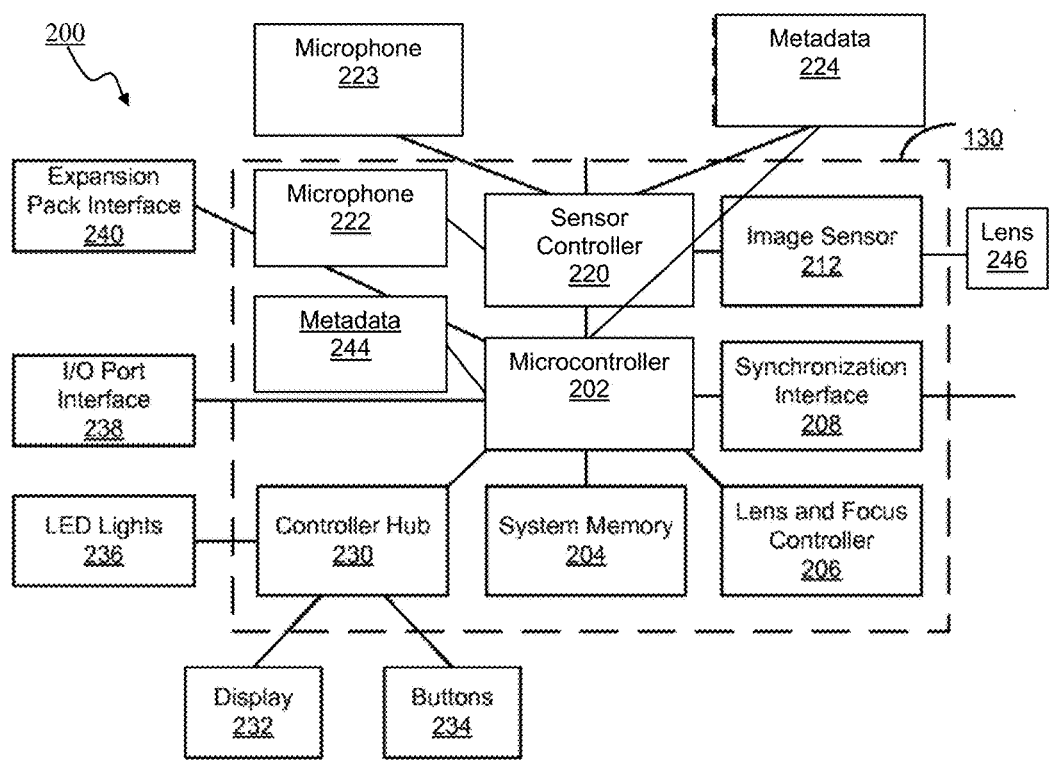
FIG. 2A is a functional block diagram illustrating one implementation of a camera system for collecting video and metadata.

FIG. 2A illustrates one implementation of a camera system for collecting video and metadata. The system 200 may comprise a capture device 130 that may include one or more microcontrollers 202 (such as microprocessors) that control the operation and functionality of the capture device 130. In some implementations, the capture device 130 in FIG. 2A may correspond to an action camera configured to produce a video and/or audio stream. The capture device 130 may include a lens 246 and focus controller 206 configured to control the operation and configuration of the camera lens. A system memory 204 is configured to store executable computer instructions that, when executed by the microcontroller 202, perform various camera functionalities including those described herein. A synchronization interface 208 is configured to synchronize the capture device 130 with other cameras or with other external devices, such as a remote control, a second capture device 130, a smartphone, a client device 120 of FIG. 1A and/or a video server.

A controller hub 230 transmits and receives information from various I/O components. In some implementations, the controller hub 230 interfaces with LED lights 236, a display 232, buttons 234, microphones such as microphones 222, speakers, and/or other I/O components.

A sensor controller 220 receives image or video input from an image sensor 212. The sensor controller 220 receives audio inputs from one or more microphones, such as microphone 222, 223. Metadata sensors 224, such as an accelerometer, a gyroscope, a magnetometer, a global positioning system (GPS) sensor, or an altimeter may be coupled to the sensor controller 220 and/or microcontroller. The capture device 130 may contain one or more other metadata/telemetry sources 244, e.g., temperature sensor. Metadata sensors 224, 244 may collect information measuring the environment and aspect in which the video is captured. For example, an accelerometer may collects capture device motion information, comprising velocity and/or acceleration vectors representative of motion of the capture device 130, the gyroscope provides orientation information describing the orientation of the device 130, the GPS sensor provides GPS coordinates identifying the location of the device 130, and the altimeter measures the altitude of the camera 130. The metadata sensors 224 are rigidly coupled to the capture device 130 such that any motion, orientation or change in location experienced by the device 130 is also experienced by the metadata sensors 224. The sensor controller 220 synchronizes various types of information received from the various sensors connected to the sensor controller 220. For example, the sensor controller 220 associates a time stamp representing when the information was captured by each sensor. Thus, using the time stamp, the measurements received from the metadata sensors 224 are correlated with the corresponding video frames captured by the image sensor 212. In some implementations, the sensor controller begins collecting metadata from the metadata sources when the capture device 130 may start to recording a video. In one or more implementations, the sensor controller 220 or the microcontroller 202 performs operations on the received metadata to generate additional metadata information. For example, the microcontroller may integrate the received acceleration information to determine the velocity profile of the capture device 130 during the recording of a video.

Additional components connected to the microcontroller 202 may include an I/O port interface 238 and an expansion pack interface 240. The I/O port interface 238 may facilitate the receiving and/or transmitting video and/or audio information through an I/O port. Examples of I/O ports or interfaces include USB ports, HDMI ports, Ethernet ports, audio ports, and/or other ports. In some implementations, The I/O port interface 238 may include wireless ports capable of accommodating wireless connections. Examples of wireless ports include Bluetooth, Wireless USB, Near Field Communication (NFC), and/or other interfaces. The expansion pack interface 240 is configured to interface with camera add-ons and removable expansion packs, such as a display module, an extra battery module, a wireless module, and/or other components.

Figure 2B:
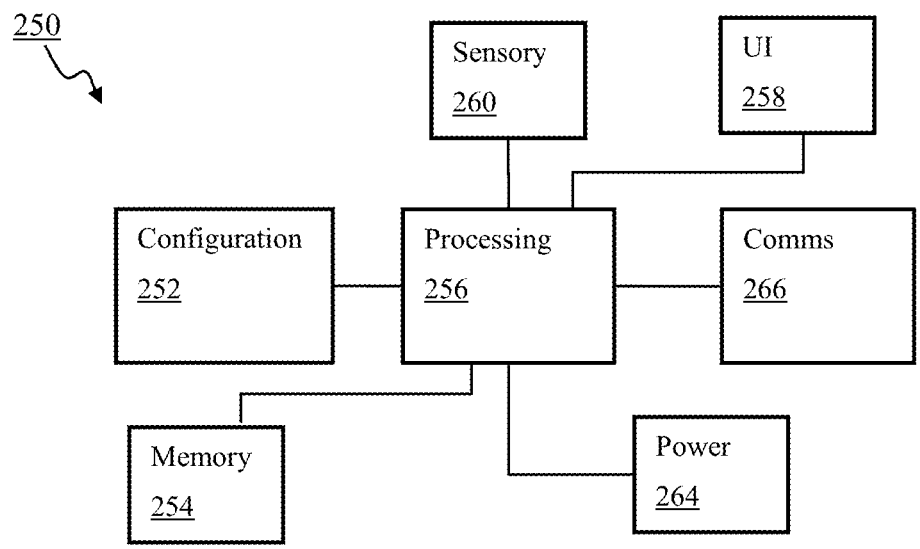
FIG. 2B is a functional block diagram illustrating one implementation of a generalized data acquisition system configured to implement metadata framework of the present disclosure.

FIG. 2B illustrates one implementation of a generalized information acquisition system configured to implement metadata framework of the present disclosure.

The system 250 may include processing component 256 coupled to sensory component, 260, user interface (UI) component, communications (comms) component 266, power component 264 and memory component 254. Other components (e.g., mechanical, electrical) may be embodies with the system 250 in order to implement target functionality, e.g., autonomous aerial drone functionality, in some implementations.

The sensory component 260 may include, without limitation, video, audio, capacitive, radio, vibrational, ultrasonic, infrared, and temperature sensors radar, LIDAR and/or sonar, and/or other sensory devices. In some implementations of capture devices, the sensory component may comprise lens, temperature sensor, MEMS, GPS, heart rate and/or other sensors.

The processing component 256 may interface to configuration component 252. The component 252 may comprise non-transitory memory configured to store configuration information and/or processing code configured to enable, e.g., video information, metadata capture and/or to produce a multimedia stream comprised of, e.g., a video track and metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory 254 may be available for other hardware/firmware/software needs of the system 250. The processing component 256 may interface to the sensory component 260 in order to obtain and process sensory information for, e.g., object detection, face tracking, stereo vision, and/or other tasks.

The processing component may interface with the mechanical, electrical sensory 260, power 264, and user interface 258 components via driver interfaces and/or software abstraction layers. Additional processing and memory capacity may be used to support these processes. It will be appreciated that these components may be fully controlled by the processing component 256. In some implementation, one or more components may be operable by one or more other control processes (e.g., a GPS receiver may comprise a processing apparatus configured to provide position and/or motion information to the component 256 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, the various components of the system 250 may be remotely disposed from one another, and/or aggregated. For example, one or more sensor components may be disposed distal from the capture device, e.g., such as shown and describe with respect to FIG. 1A. Multiple mechanical, sensory, or electrical units may be controlled be a learning apparatus via network/radio connectivity.

The user interface components 258 may comprise virtually any type of device capable of registering inputs from and/or communicating outputs to a user. These may include, without limitation, display, touch, proximity sensitive interface, light, sound receiving/emitting devices, wired/wireless input devices and/or other devices.

The electrical components may include virtually any electrical device for interaction and manipulation of the outside world. This may include, without limitation, light/radiation generating devices (e.g. LEDs, IR sources, light bulbs, and/or other devices), audio devices, monitors/displays, switches, heaters, coolers, ultrasound transducers, lasers, and/or other electrical components. These devices may enable a wide array of applications for the robotic apparatus in industrial, hobbyist, building management, medical device, military/intelligence, and other fields.

The communications interface 266 of FIG. 2B may include one or more connections to external computerized devices to allow for, inter alia, management of the processing and/or robotic device, e.g., as described above with respect to FIGS. 1A-1B and/or with respect to FIG. 2A. The connections may include any of the wireless or wireline interfaces discussed above, and further may include customized or proprietary connections for specific applications. In some implementations, the communications interface 266 may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the capture device (e.g., 130 in FIG. 1B) and a remote device (e.g., 120 in FIG. 1B).

The power system 264 of FIG. 2B may be tailored to the needs of the application of the device. For example, for a small-sized lower power appliance, a wireless power solution (e.g. battery, solar cell, inductive (contactless) power source, rectification, and/or other) may be appropriate. For building management applications, battery backup/direct wall power may be superior.

Figure 3:
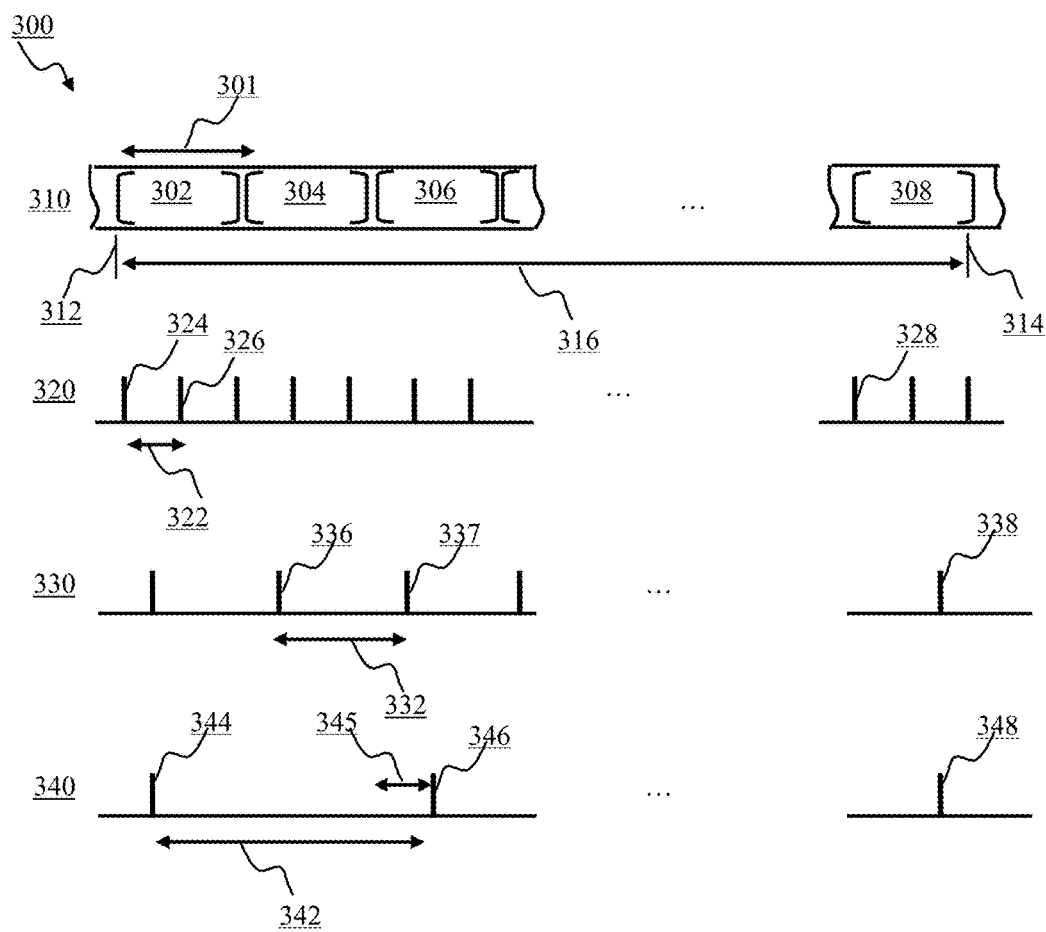
FIG. 3 is a functional block diagram illustrating timing of video frames and metadata payload for use in, e.g., system of FIG. 1A and/or FIG. 1B in accordance with one implementation.

FIG. 3 illustrates timing of video frames and metadata payload in accordance with some implementations.

In order to provide for an efficient and human readable metadata packing format for use with a streaming multimedia content the following approach may be used, in some implementations. As used herein the terms streaming multimedia content, streaming file, multimedia stream may be used to describe a digital data package comprised of two or more heterogeneous components (tracks), e.g., video, audio, metadata, configured such that any given portion of the multimedia stream corresponding to a given time window contains all of the relevant tracks for that window. By way of an illustration, a time window Tstart<t<Tend may correspond to a snowboarder performing a jump; the multimedia stream object may comprise (i) a sequence of frames (e.g., 302, 304, 306, 308 in FIG. 3) between time instances Tstart and Tend (312, 314, respectively in FIG. 3); and accelerometer information (shown by sequence 320 in FIG. 3) within the interval Tstart<t<Tend (316 in FIG. 3). Provision of the video track 310 and the associated acceleration information 320 may enable a recipient (content consumer) of the multimedia information package to determine one or more time instances associated with the jump (e.g., take off moment, zero gravity portion, landing moment), and/or other parameters.

Figure 4A:
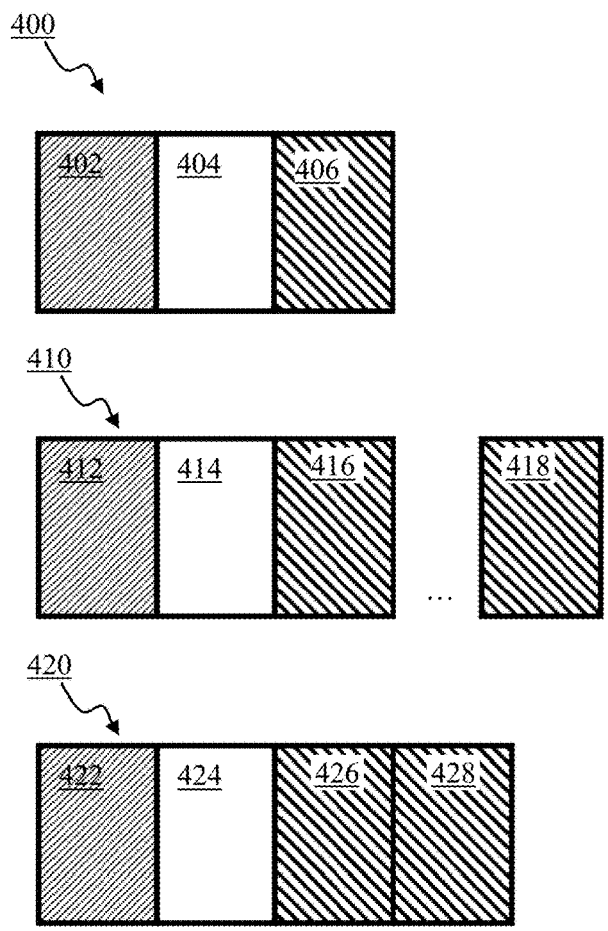
FIGS. 4A-4B illustrate metadata format in accordance with one or more implementations.
Figure 4B:
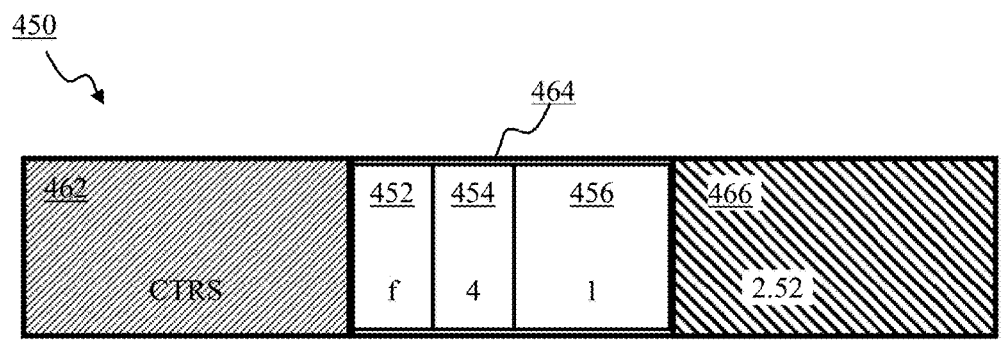

In one or more implementations, the metadata may be arranged in the multimedia stream using a self-explanatory format, e.g., such as shown and described with respect to FIGS. 4A-4C. FIG. 4A illustrates metadata records 400, 410, 420. In some implementations, the metadata records 400, 410, 420 may be stored in the metadata track of a multimedia stream (e.g., MP4). The metadata records 400, 410, 420 may be configured to comprise a MetadataTag field 402, 412, 422, a MetadataTypeSize field 404, 414, 424 and one or more information blocks (e.g., 406, 416, 418, 426, 428). In some implementations, the blocks 406, 416, 418, 426, 428 may be configured as 32-bit aligned values.

The MetadataTag field (402, 412, 422) may comprise a 32-bit four character code (fourCC) configured to identify metadata sensor, and/or type of metadata sensor. The use of fourCC tag configuration provides for readability of the file by a human as character codes may be easily discerned when, e.g., viewing the multimedia stream using a hex editor tool. Listing 1 provides several exemplary tags for use with the methodology of the disclosure, in accordance with one or more implementations.

1. #define MAKEID (d,c,b,a)
   (((a)>>24)|((b)<<16)|((c)<<8)|(d))
2. typedef enum IDTag
3. {
4. //function IDTag
5. METADATA_TAG_FREESPACE=MAKEID('F', 'R', 'E', 'E'), //FREE c n bytes reserved for more metadata
6. METADATA_TAG_COLOR_MATRIX=MAKEID ('C', 'O', 'L', 'M'), //COLM f12 floats (4×3 matrix)
7. METADATA_TAG_EXPOSURE=MAKETAG('E', 'X', 'P', 'S'), //EXPS f1 float//unity 1.0 range 0 to 8
8. METADATA_TAG_TIMECODE=MAKETAG('T', 'I', 'M', 'C'), //TIMC c11 chars in format 00:00:00:00"
9. METADATA_TAG_TIMING_OFFSET=MAKEID ('T', 'I', 'M', 'O'), //TIMO—Time offset of the metadata stream that follows (single 4 byte float)

10. METADATA_TAG_DEVICE=MAKEID('D', 'E', 'V', 'C'), //DEVC—nested device data to speed the parsing of multiple devices in post
11. METADATA_TAG_STREAM=MAKEID('S', 'T', 'R', 'M'), //STRM—nested channel/stream of telemetry data
12. METADATA_TAG_DEVICE_ID=MAKEID('D', 'V', 'I', 'D'), //DVID—unique id per stream for a metadata source (in camera or external input) (single 4 byte int)
13. METADATA_TAG_DEVICE_NAME=MAKEID ('D', 'V', 'N', 'M'), //DVNM—human readable device type/name (char string)
14. METADATA_TAG_UNITS=MAKEID('U', 'N', 'I', 'T'), //UNIT—Display string for metadata units (char sting like "RPM", "MPH", "km/h", etc)
15. METADATA_TAG_RANGE_MIN=MAKEID('R', 'M', 'I', 'N'), //RMIN—Value range min and max can be used to predict Gauge rendering ranges.
16. METADATA_TAG_RANGE_MAX=MAKEID('R', 'M', 'A', 'X'), //RMAX—
17. METADATA_TAG_SCALE=MAKEID'S', 'C', 'A', 'L'), //SCAL—divisor for input data to scale to the correct units.
18. TAG_END=MAKEID(0x0, 0x0, 0x0, 0x0), //(NULL)
19. }

Listing 1

Table 2 illustrates exemplary metadata tag codes for a plurality of telemetry metadata sources in accordance with one or more implementations. As used herein the term telemetry may be used to describe measurement of one or more parameters associated with video camera operation that maybe provided by a sensor internal to the camera (e.g. built in accelerometer) and/or external sensor (e.g., GPS, heart rate monitor). Individual telemetry sensors may provide information at one or more sample rates (e.g., as shown and described with respect to FIG. 4A below), precision.

TABLE 2

| Telemetry Source | Metadata Tag | Data order |
| --- | --- | --- |
| 3 axis Gyro | GYRO | X, Y, Z |
| 3 axis Accelerometer | ACCL | X, Y, Z |
| 3 axis Magnetometer | MAGN | X, Y, Z |
| 6 axis combined IMU Accl + Gyro | IMU6 | 3 components (XYZ) of acceleration, then 3 component of Gyroscope output |
| 9 axis IMU Accl + Gyro + Magn | IMU9 | 3 components (XYZ) of acceleration, 3 component of Gyroscope output, 3 components of magnetic field sensor |
| 2-axis GPS | GPS2 | Latitude, Longitude |
| 3-axis GPS | GPS3 | Latitude, Longitude, Altitude |
| GPS Time & Date | GPST | Date + UTC Time format yymmddhhmmss.sss |
| GPS Count | GPSC | satellite count |
| GPS Lock | GPSL | 0 -none, 2-2D, 3-3D lock |

Table 3 illustrates exemplary metadata tag codes for a plurality of image acquisition parameters employed by camera sensor and/or image processor, [e.g., component 220 in FIG. 2A in accordance with one or more implementations.

TABLE 3

| Image Parameters | MetadataTag | Value |
| --- | --- | --- |
| Shutter Speed | SHUT | Time in seconds for exposure time |
| Rolling Shutter Time | ROLL | Time in seconds from top to bottom of the frame |
| White Balance | WBAL | Kevin value for white balance (calculated or applied) |
| Effective ISO | EISO | Sensor and digital gains combined as an effective ISO value |
| Sensor Temp | STMP | Sensor Temperature in degrees C or F |

The MetadataTypeSize field (e.g., 404, 414, 424 in FIG. 4A) may comprise a 32-Bit field comprised of the following components:
  MetadataItemType (8-bit);
  MetadataItemSize field (8-bit), and
  MetadataItemRepeat field (16-bit).
Individual components of the MetadataTypeSize field are illustrated by field 464 of the metadata record 450 in FIG. 4B in accordance with one or more implementations. The MetadataItemType field (452 in FIG. 4B) may comprise a single character field that may be used to characterize format of the information item the within payload (e.g., the smallest unit of the payload). By way of an illustration, 32-bit floating value may correspond to type 'f', 8-bit character string may be characterized by type 'c', a single character being smallest unit; three component 16-bit accelerometer payload may be characterized by type 's', with a single acceleration value is a short (2 bytes) integer. All three components of acceleration (e.g., x,y,z values) consist of the same MetadataItemType throughout the metadata record.

Listing 2 illustrates several exemplary MetadataItemType entries that may be used to characterize metadata record in accordance with one or more implementations.
1. typedef enum
2. {
3. METADATA_TYPE_STRING='c', //single byte 'c' style character string
4. METADATA_TYPE_SIGNED_BYTE='b', //single byte signed number
5. METADATA_TYPE_UNSIGNED_BYTE='B', //single byte unsigned number
6. METADATA_TYPE_DOUBLE='d', //64-bit double precision float (IEEE 754)
7. METADATA_TYPE_FLOAT='f', //32-bit single precision float (IEEE 754)
8. METADATA_TYPE_FOURCC='F', //32-bit four character tag
9. METADATA_TYPE_GUID='G', //128-bit ID (like UUID)
10. METADATA_TYPE_HIDDEN='h', //internal information not displayed (formatting not reported)
11. METADATA_TYPE_UNSIGNED_LONG_HEX='H', //32-bit integer to be displayed 0xaabbccdd
12. METADATA_TYPE_SIGNED_LONG='l', //32-bit integer
13. METADATA_TYPE_UNSIGNED_LONG='L', //32-bit integer in 16/32 bit architecture
14. METADATA_TYPE_Q15_16_FIXED_POINT='q', //Q number Q15.16—16-bit 4signed integer (A) with 16-bit fixed point (B) for A.B value (range −32768.0 to 32767.99998).

15. METADATA_TYPE_Q31_32_FIXED_POINT='Q', //Q number Q31.32—32-bit signed integer (A) with 32-bit fixed point (B) for A.B value.
16. METADATA_TYPE_SIGNED_SHORT='s', //16-bit integer
17. METADATA_TYPE_UNSIGNED_SHORT='S', //16-bit integer
18. METADATA_TYPE_XML='x', //XML, support other systems metadata
19. METADATA_TYPE_CUSTOM_DATA=0, //used to nest more metadata
20. // Add more metadata types here
21.} MetadataType;

Listing 2

As shown by Listing 2, MetadataItemType field may be used to describe the display formatting as well as the format of the metadata items. Values of type 'L' may describe 32-bit long integers, yet 'H' for hex formatting may suggest a presentation of 0xAABBCCDD for the output. MetadataItemType 'c' and 'b', are one byte in size, yet the MetadataItemType 'c' may be displayed as a character string' the MetadataItemType 'b' may be displayed as a signed integer number. Five byte values of type 'b', e.g. 0x48 0x65 0x6c 0x6c 0x6F may be displayed as 72, 101, 108, 108, 111; five byte values of type 'c' may be displayed as "Hello".

The payload MetadataItemSize field (e.g., 454 in FIG. 4B) may comprise a binary 8-bit integer indicating number of bytes per metadata item. By way of an illustration, an 8-bit character string of type 'c', may correspond to the MetadataItemSize size of 1. Three 16-bit accelerometer values of type 's' may correspond to the MetadataItemSize of 6 bytes (3×sizeof(short)).

The payload MetadataItemRepeat field (e.g., 456 in FIG. 4B) may comprise 2 byte (16 bit) a big-endian binary code integer value containing information related to number of items in the payload record. Number of items in the payload may correspond to e.g., e number of samples (e.g., temperature wherein individual samples may comprise a single value), and/or number of samples wherein a given sample may comprise multiple values (e.g., 3-components of acceleration may correspond to 3×16-bit values forming one payload item).

By way of an illustration, 8-bit character string 'c' containing "GoPro HERO", may correspond to the MetadataItemRepeat value of ten (structure size for a string of 10 characters). A sequence of 20 samples (items) of 3-component acceleration of type 's' (e.g., 16-bit), may correspond to MetadataItemRepeat repeat of 20 with the MetadataItemSize of 6 (3×2) bytes.

Figure 10:
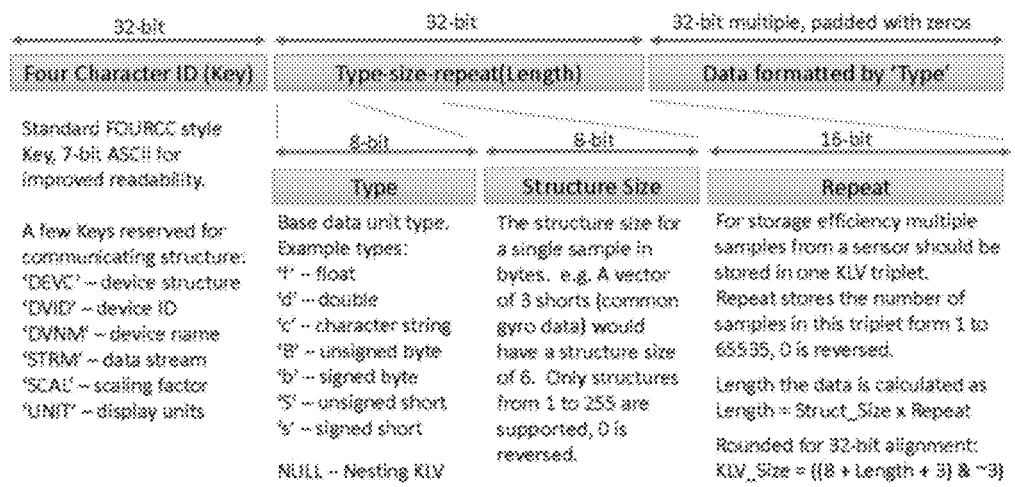
FIG. 10 is a table listing exemplary metadata record structure, in accordance with one or more implementations.

A table shown in FIG. 10 lists exemplary metadata record structure, in accordance with one or more implementations.

A table shown in FIG. 11 illustrates an exemplary metadata record, in accordance with one or more implementations.

FIG. 4B illustrates storing 32-bit floating point contrast value using the formatting methodology of the disclosure. The metadata record 450 of FIG. 4B may contain 32 bit tagID 462, containing description of the metadata (e.g., "CTRS" denoting contrast). The metadata record 450 of FIG. 4B may contain 32 bit MetadataTypeSize description field 464. The first byte of the field 464 contains 8-bit typeID 452 value denoting format of the metadata. As shown in FIG. 4B, the field 452, contains single character '1' denoting 32 bit floating point value in the metadata record. Subsequent byte of the field 464 contains 8-bit field size 454 value denoting size of single metadata element in bytes. As shown in FIG. 4B, the field 454, contains value of 4 denoting 4-byte (32 bit) value in the metadata record. Subsequent two bytes of the field 464 contain 16-bit MetadataItemRepeat 456 value denoting number of metadata elements (items) in the metadata record. As shown in FIG. 4B, the field 456, contains value of 1 denoting single (not repeated) value being present in the metadata record. Next one or more bytes of the metadata record may contain the metadata value (the payload). As shown in FIG. 4B, the 4-byte field 466 contains floating point contrast value of 2.52.

In some implementations, metadata record may be configured as 32-bit aligned byte sequence. Size of the metadata record may be determined as $$S = 8 + \text{ItemSize} \times \text{MetadataItemRepeat bytes.}$$

In some implementations wherein the payload information as provided by a sensor (e.g., 102, 112 in FIG. 1B) may not be 32-bit aligned, the metadata record may be padded out with zeros to produce 32-bit aligned metadata record. In some implementations, the metadata record may be stored in Big endian format.

Returning now to FIG. 4A, record 400 may correspond to metadata comprising a single item with the size no greater than 32 bits (e.g., a white balance value, camera gain, sensor temperature, and/or other parameter). If the information within the item 406 in FIG. 4A occupies less than 32 bits (e.g., temperature provided as a 2-byte unsigned short integer) the item field (e.g., 406) may be padded with two zero bytes to produce 32-bit aligned record 400.

Record 420 In FIG. 4A may correspond to metadata comprising a single item with the size between 33 bits and 64 bits inclusive (e.g., a set of 2D GPS 32 bit coordinate values, a single set of three 16 bit acceleration component values and/or other parameter). In some implementations, record 410 In FIG. 4A may represent metadata comprising multiple metadata items with the total size of no greater than 64 bits (e.g., eight characters, four 16 bit temperature values and/or other parameter configuration).

Record 410 in FIG. 4A may represent metadata record comprising multiple metadata items (e.g., output of an inertial measurement unit (IMU)) packed to produce the 32-bit aligned record.

In some implementations, metadata record may comprise a nested record, e.g., such as shown and described with respect to FIG. 4C. A nested record may comprise two (or more) sensor information records (also referred to as sub-records). For example, nested record 430 shown in FIG. 4C may comprise sub-records 431, 440. It is noteworthy, that individual sub-records (e.g., 431, 440) of a nested record (430) may be configured in accordance with the metadata record structure of the present disclosure, e.g., such as shown and described above with respect to FIG. 4A and/or FIG. 4B.

Data within a given sub-record (e.g., 431, 440 of FIG. 4C) may correspond to information from a given metadata source (sensor). By way of an illustration, sub-record 431 may contain acceleration information, while sub-record 440 may contain heading information, white balance information, and/or other information.

A nesting indication may be employed in order to denote a nested record. In some implementations, the nesting indication may comprise a NULL (0x00) value of the MetadataItemType field, e.g., contents of the field 452 in FIG. 4B. Definition of the nesting MetadataItemType indication is illustrated at line 19 of Listing 2.

In some implementation of parsing metadata record (e.g., 430 of FIG. 4C), MetadataTypeSize and MetadataItemRepeat fields may be used to convey size of the nested record to a parsing process. By way of a non-limiting illustration, MetadataTypeSize of 1, and the MetadataItemRepeat of 2048 may be used to indicate nested record of 2048. Upon deconding the nesting indication (e.g., the MetadataItemType value of 0x00) the MetadataTypeSize value, and MetadataItemRepeat value, the parsing process may skip over the contents of the nested record if appropriate (e.g., when the parsing process may not be provided with information related to type of a given fourCC code, and/or when information from a given source (e.g., temperature) may not be utilized for a given processing function (e.g., determination of a jump). In some implementations, wherein the nested record may contain payload in excess of 64 kB, the MetadataTypeSize value may be incremented by 1 for every 64 kB of information. By way of an illustration, item size of 4 may be used to indicate 256 kB payload; item size of 255 may be used to indicate 16 MB nest payload.

FIG. 12 is a table providing an example of metadata record configured using nesting, in accordance with some implementations. The metadata record of FIG. 12 may be used to describe attitude information as follows:

DEVC (device information—nested with size [0x144] 324 bytes)

DVID (device ID—auto assigned to be unique within each capture) 1 long integer

DVNM (string name) 15 bytes character string "device-attitude"

ATTD (sensor information stream) Type 'B'—bytes, Structure sizes 28 bytes, with 10 samples. A total of 280 bytes of raw sample information follows;

Nested metadata records may be embedded as sub-records of a higher level metadata record. Number of nested level may be arbitrarily large, provided a parsing process has sufficient hardware processing resources (e.g., memory). In some implementations, the nested metadata sub-record may be terminated with a TAG_END (shown at line 20 of Listing 1) indication in order to transition the parsing process to previous level of nested hierarchy and to continue metadata record parsing. It will be recognized by those skilled in the arts that general structure (e.g., types of metadata and metadata value types) of binary metadata record may be visually decoded by human operator when viewed using, e.g., a common hex editor tool.

Listing 3 illustrates use of a regular metadata record to store double precision 3D GPS position (e.g., longitude, latitude, altitude) as follows:

GPSP 'd' 24 1<information>

Listing 3 where information denote longitude, latitude, altitude values.

Listing 4 and 5 illustrate use of metadata record nesting to store complex structures. Using nesting, the GPS information may be formatted as follows:

1. GPSL 0 1 48
2. GPSX 'd' 8 1<longitude>
3. GPSY 'd' 8 1<latitude>
4. GPSZ 'd' 8 1<altitude>

Listing 4

In the first line of Listing 4, value of '0' after the tag 'GPSL' is used to indicate nested payload. The nested record of Listing 4 comprises three metadata records: GPSX, GPSY, GPSZ. Individual records GPSX, GPSY, GPSZ may be formatted in accordance with the format described herein. While the metadata record configuration of Listing 4 may require larger storage (e.g., due to 8 byte of header information per record), nesting may enable omitting one or more of records form a given payload. By way of an illustration, one or more of individual GPSX, GPSY, GPSZ records may be omitted in a payload when nesting is used, e.g., as illustrated in Listing 5.

1. GPSL 0 32 1
2. GPSX 'd' 8 1<longitude>
3. GPSY 'd' 8 1<latitude>

Listing 5

Metadata storage format of the present disclosure provides for memory efficient storage, rapid parsing and/or enables extension to include one or more tags, e.g., by third parties. To avoid potential conflicts (e.g., namespace collisions), the following naming rules may be utilized: GoPro MetadataTag may reserve the use of uppercase fourCC entries, e.g., so that definition of EXPS may not clash with a third party usage. Entities outside GoPro may utilize lowercase and/or mixed case tags. By way of an illustration, tags 'Exps' and 'exps' in third-party implementations may not clash with the 'EXPS' tag.

Referring now to FIG. 3, structure of metadata is shown and described in accordance with some implementations. Track 310 in FIG. 3 denotes video track comprising frames 302, 304, 306, 308 characterized by frame duration 301; tracks 320, 330, 340 in FIG. 3 denote metadata1, metadata2, metadata3 tracks. Individual tracks 320, 330, 340 may correspond to metadata characterized by a respective sampling rate, e.g., as shown by inter-sample intervals 322, 332, 342, respectively, in FIG. 3. The MP4/MOV track or tracks used to contain the metadata may be configured at a fixed time interval. The period of the metadata track may be defined at file creation.

In some implementations the metadata payload (e.g., such as illustrated in Table 3) may be produced by a source (e.g., video processor) that may be synchronized with the video frame generation process. In this example, metadata (e.g., GAIN, WBAL) may be stored once per image as shown by track 330 in FIG. 3 (or once per several images not shown); video track timing information may be may be used to determine timing of the metadata (e.g., timing of samples 336, 337, 338 in FIG. 3).

Video frame related camera internal metadata may be characterized by a regular payload, with a predictable number of entries. By way of an illustration, per frame metadata for a 30 frames per second video track, for a once per second metadata payload may be expressed as follows:

GAIN 'f' 4 (bytes) 30 (repeat) 1.00, 1.10, 1.02 . . . 1.31

Listing 6

In Listing 6 the MetadataItemRepeat field is used to indicate that the GAIN value may be repeatedly stored for 30 times. When there is more than one value per time slot, like the three RGB values for white balance, the three values are added n-times based on the repeat.

WBAL 'f' 12 (bytes) 30 (repeat)
r0,g0,b0,r1,g1,b1, . . . r29,g29,b29

Listing 7

Very little overhead is required to store the metadata in this format. Yet more compression may be available in the event that the metadata does change during the payload time. If white balance is static, instead of 368 bytes for the 30 frames, only 20 bytes are required.

WBAL 'f' 12 1 r, g, b

Listing 8

In some implementations of telemetry, metadata may be collected by a metadata source (e.g., sensor) based on a regular sampling period (either internal to the camera, e.g., 112 in FIG. 1B; and/or external to the camera, e.g., 102, 104 in FIG. 1B). The metadata source may be operable in accordance with its internal clock. Clock information may not be readily available to the metadata storing process (e.g., when storing combined multimedia stream in storage 116 and/or communicating combined multimedia stream via link 126 in FIG. 1B).

In one or more implementations of slowly varying (e.g., relative video information frame rate) metadata (e.g., heart rate, average position, ambient pressure, ambient temperature, and/or other information), the metadata track (e.g., track 340 in FIG. 3) may be configured to store metadata at a time scale corresponding to multiple frames, e.g., time scale 342 is greater than the frame duration 301. In some implementations, slow varying metadata may be stored once every 1-10 seconds. Frame timing information (e.g., frame index combined with frame duration 301) may be used to recover timing of the metadata of track 340.

In one or more implementations, the metadata may be configured to be stored at a rate that is greater than the video frame rate, e.g., as illustrated by track 320. For example, IMU information may be stored at rates between 50 and 1000 times per second which may correspond to multiple metadata samples per frame, e.g., samples 326, 324 corresponding to frame 302 in FIG. 3. In some implementations, timing information may be stored in the metadata payload in order to recover timing of the metadata, as described in detail below.

The number samples (items) in the metadata track does not have to match the number of frames in the video track. The metadata items may be evenly distributed over the metadata payload time window, in some implementations. By way of an illustration, payload with 10 Hz GPS information may comprise 10 values for a one second time window of metadata payload.

When metadata track comprises samples occurring more frequently than the frames (e.g., track 320 in FIG. 3) and metadata source clock information may not be available (e.g., metadata being provided by an external sensor 102, 104 such as GPS, heart rate monitor, cadence sensor, and/or other sensor), the following approach may be used to determine timing of individual samples within the metadata record relative video frame occurrence. A number of metadata items (samples) may be determined within a given time window (e.g., 316 in FIG. 3). Duration of the window 316 may be determined using timing information from the video track (e.g., number of frames and frame duration 301). Provided there are no missing metadata samples, effective sampling interval of the metadata track (e.g., 322) may be determined by dividing duration 316 of capture window by number of metadata payload items (samples).

Some sensor information, such as GPS coordinates representing a position, may be delayed relative start time t0 of video track. That is, GPS position obtained at time t0 may correspond to a slightly earlier time instance t1<t0. Timing for each payload may be accurately represented within the MP4 track index; timing corrections may be configured relative to the payload start and end times. By way of an illustration, for payload duration of 10 s, a timing offset of 1.0 may be used to denote the full sample duration of 10 s; timing offset of 0.1 may be used to denote the duration of 1 s. When GPS information may be delayed by one sample where there are 10 samples per payload, a timing offset of −0.1 maybe used to provide the timing correction.

Listing 9 illustrates use of the timing correction fourCC MetadataType identifier TIMG. Upon decoding the TIMG identifier, the parsing process may apply respective timing corrections to one or more subsequent metadata records. In one or more non-nested metadata record implementations, time correction value provided by a given TIMG payload may be applied until a subsequent TIMG payload occurs. In one or more nested metadata record implementations, time correction value provided by a TIMG payload for a given level of nesting may be applied to individual metadata records within the given nesting level.

1. STRM 0 . . . <next>
2. TIMG 'f' 4 1 −0.1
3. GPSP 'd' 24 10<location>,<location > . . . <location>

Listing 9

Timing correction payload may be configured in accordance with the self-described metadata formatting methodology of the present disclosure. As shown at line 3 of Listing 9, TIMG identifier may be followed by 8-bit MetadataItemType ('f'); followed by MetadataItemSize field (4 bytes, one 4-byte float values), followed by MetadataItemRepeat field (1 repeats), followed by a floating point value −0.1, that may be interpreted as timing offset. Use of nesting nest associates timing corrections provided by the TIMG metadata is with GPSP information within this STRM (stream). The TIMG payload value (−0.1) may denote the offset as a fraction of the payload duration: negative offset may be used to denote delay, positive offset may be used to denote an early metadata arrival relative, e.g., video track.

In some implementations of burst payload (e.g., unscheduled events), TIMG record may be used to provide timing information as follows.

1. STRM 0 . . . <next>
2. TIMG f 8 1 −11.0 1.0 timing for the missed information
3. BLUT s 6 410<sample><sample> . . . <sample>

Listing 10

The following TIMG record may be used to reset timing offset for one or more subsequent metadata records.

TIMG 'f' 8 1 0.0, 1.0.

Listing 11

In some implementations, metadata stream GPS will lose satellites, Bluetooth based sensors will go out of range, both cases can mess with clock extraction, if these events aren't noted. GPS lock loss could simply hold the last know position, keep the sample rate constant, yet even if only locked coordinates are stored clock extraction is still possible, allowing the post software to decide (better than the camera) what to do with the missing samples (rather than holding last position.) Consider these payloads for GPS information where lock is established after record start and the camera traveled temporarily through a tunnel.

The example shown in a table in FIG. 13 presents 32 second capture. Time series of GPS number of samples may be used in order to determine periods of valid information and/or periods of drop outs. By way of an illustration, using information from payload number 6 through payload number 13 effective sampling rate of the GPS sensor may be determined. The GPS sampling rate and timing of the payload number 6 may be used to determine time when the GPS lock within payload 5 was acquired; The GPS sampling rate and timing of the payload number 13 may be used in order to determine when the GPS lock was lost within payload 14. In some implementations, an estimate of GPS position corresponding to missing samples (e.g., payload 14 through 18) may be obtained using, e.g., an interpolation, and/or another information recovery model (e.g., Kalman filter). In some implementations, sticky metadata approach may be employed when handling metadata from sources that may be subject to dropouts (e.g., such as heart rate monitor 154 and/or GPS receiver 152 that may be communicating via Bluetooth with the camera 170). Metadata device (source) may be declared as "sticky", e.g., as shown in Listing 12. When a dropout occur for metadata device declared as sticky, a previous metadata payload value may be utilized for one or more subsequent payloads until updated information may arrive from the metadata device. By way of an illustration with respect to FIG. 13, GPS device metadata may be declared as sticky; payload values 14 through 18 may repeat value of payload 13.

It may be recognized by those skilled in the arts that depending on parameters of a given application, sticky metadata may be utilized to "fill in the gaps" during sensor drop outs. By way of an illustrations, a heart rate during a steady activity (e.g., no acceleration/deceleration) may be characterized by a given rate value (e.g., between 130 and 135 beats per minute). Repeating the last valid hear rate value (e.g., 132) may provide a reasonable indication of during the drop out, provided the activity remained steady. While sticky values of speed derived from GPS information on a straight course, may be used to fill in the gaps during communication drop outs, sticky position information may be analyzed with care and/or interpolation be employed once the drop out has ended.

In some implementations, metadata may be embedded as a text track in an MP4 or MOV container. In one or more implementations metadata may be stored in a file separately from the video.

In some implementations, samples of telemetry information may be stored in the text track with additional metadata records that provide timing information. Individual metadata chunks corresponding to a sample from the text track may be stored in the binary file as a PAYL record that may include a PTIM record in order to provide start time of the metadata chunk and a PDUR record that may provide the duration of the chunk. The start time for the metadata chunk may be configured to match the start time of the sample in the container. The duration for the metadata chunk may be configured to match the duration of the sample in the container.

One or more metadata sources (e.g., sensors 102, 104, 112 in FIG. 1B) may be registered as a "metadata device" with the metadata service. A device is a metadata source providing one or more streams. A device may comprise, e.g., an internal IMU, GPS, image processor, an external Bluetooth Heart Rate monitor, and/or other sensor.

The following provides a pseudo code example for registering a metadata source in accordance with one or more implementations.

1. //Initialization per device
2. deviceID=MetadataNewDeviceID("device_name"); //←a proposed new function, called once per metadata source, even if a asource has multiple streams/channel of information.
3. if (deviceID)
4. {
5. for (i=0; i<n_streams; i++)
6. {
7. streamHandle[i]=MetadataStreamOpen(deviceID, estimated_bytes_per_second); //the devicename could move from MetadataStreamOpen( ) to MetadataNewDevice( );
8. if (streamHandle[i])
9. {
10. //store all stream description metadata, range, units, etc.
11. MetadataStreamWrite(streamHandle[i], . . . META-DATA_FLAGS_STICKY);
12. MetadataStreamWrite(streamHandle[i], . . . META-DATA_FLAGS_STICKY);
13. . . .
14. }
15. }
16. }
17. //live information for each source
18. while(newdata)
19. MetadataStreamWrite(streamHandle[i], . . . , NULL);

Listing 12

Listing 13 Illustrates Use of Metadata Source API in Accordance with One Implementation.

1. //Open a new stream for a particular device, a device may have multiple stream (e.g. the GoPro IMU has ACCL, GRYO and MAGN). Open with device ID name, used for internal telemetry and third party contented devices. The estimated buffer size, will depended on how often metadata is flushed from memory to the MP4. If all the metadata payload is stored at 1 Hz into the MP4 and GoPro IMU requires an average of 10 kBytes, use an estimate for 15000. This is to prevent memory allocations during a MetadataStreamWrite( ) and prevent any prolonged semaphore locks.
2. size_t MetadataStreamOpen(
3. uint32_t device_id,
4. char *device_name,
5. uint32_t estimate_buffer_size
6.);
7. //Send RAW information to be formatted for storing within the MP4 text track
8. unsigned long MetadataStreamWrite(
9. size_t handle,
10. uint32_t tag,
11. uint32_t information type,
12. uint32_t sample_size,
13. uint32_t sample_count,
14. void*data,
15. float time_delay_seconds, //default to zero, only use in the information is significantly delayed
16. uint32_t flags//e.g. METADATA_FLAGS_STICKY
17.);
18. //Close if a device is disconnected by the user (user turns the GPS off, or disconnects an external Bluetooth device.
19. void MetadataStreamClose(size_t handle);

Listing 13

Listing 14 illustrates use of computer programming language pseudocode to acquire metadata from a metadata source using the principles of the present disclosure.

```
1. //sample usage 1—Internal Accl/Gryo/Mag
2. //Open a stream for Accel
3. handle[0]=MetadataStreamOpen(0x1001, "GoPro Telemetry", 15000); //Reserved Device IDs for internal metadata
4. //Open a stream for Gyro
5. handle[1]=MetadataStreamOpen(0x1001, "GoPro Telemetry", 15000);
6. //Open a stream for Magnetometer
7. handle[2]=MetadataStreamOpen(0x1001, "GoPro Telemetry", 10000);
8. while(recording && error==None) //as information arrives
9. {
10. int count;
11. float data[300]; //x,y,z values
4.
12. count=ReadAccelValues(data, 100); //read what pending up to 100 x,y,z values
13. if(count >0) error=MetadataStreamWrite(handle[0], METADATA_TAG_ACCEL_3AXIS, METADATA_TYPE_FLOAT, 3*sizeof(float), count, (void *)data, 0.0f);
14. count=ReadGryoValues(data, 100); //read what pending up to 100 x,y,z values
15. if(count >0) error=MetadataStreamWrite(handle[1], METADATA_TAG_GYRO_3AXIS, METADATA_TYPE_FLOAT, 3*sizeof(float), count, (void *)data, 0.0f);
5.
16. count=ReadNextMagnetometer(data); //read what pending up to 100 x,y,z values
17. if(count >0) error=MetadataStreamWrite(handle[2], METADATA_TAG_MAGNITOMETER, METADATA_TYPE_FLOAT, 2*sizeof(float), count, (void *)data, 0.0f);
18.}
19. MetadataClose(handle[2]);
20. MetadataClose(handle[1]);
21. MetadataClose(handle[0]);
22. //sample usage 2—External Telemetry (like Heart Rate monitoring)
23. handle=MetadataStreamOpen(1, "XZZY Heartrate", 100);
24. while(recording && error==None) //as information arrives
25. {
26. unsigned short value=BT_ExtractNextInteger(bt_id); //a call to the BlueTooth service to return information
27. error=MetadataStreamWrite(handle, TAG_HEART_RATE, METADATA_TYPE_SIGNED_SHORT, 2, 1, (void *) & value, 0.0f);
28.}
29. MetadataStreamClose(handle);
```

Listing 14

Listing 15 illustrates use of computer programming language pseudocode to obtain metadata payload from an internal metadata service in accordance with some implementations.

```
1. //Called once to initialize the semaphore to manage the source list of metadata streams
2. void MetadataServiceInit( );
3. //Called for each payload to be sent to the MP4, returns a pointer to alloc'd memory and its size.
4. void MetadataGetPayload(uint32_t **payload, uint32_t*size);
5. //Free the payload after it is flush to the MP4.
6. void MetadataFreePayload(uint32_t *payload);
7. //Unlikely be used, but removes the semaphore managing the metadata streams, after all streams have been closed.
8. void MetadataServiceClose( );
```

Listing 15

In some implementation, metadata may be stored within an additional track within the MP4. This is loosely described as the "Text track" as it original purpose was to carry closed caption information within video files. One motivation for using the text track, is all MP4 tracks have accurate timing and indexing information all reference to a universal time base (timing between the tracks may be known). ISO/IEC 14496-12 MPEG-4 part 12 specification ("Information technology—Coding of audio-visual objects—Part 12: ISO base media file format; ISO/IEC 14496-12:2008", International Organization for Standardization. Retrieved 2009 Jul. 29.), the foregoing being incorporated herein by reference in its entirety, provides description of text track and video track timing configuration for an MPEG-4 container format.

In some implementations, in order to prevent facilitate playback or MPEG-4 media comprising metadata embodied within the text track, the following approach may be utilized. A custom four character code (fourCC) handler may be declared for the text track, e.g., 'gpmf' GoPro Metadata Format. A media player, e.g., VLC, upon decoding the "gpmf" handler no longer interprets the metadata as an available subtitle track.

In some implementations, the text track header may comprise information, e.g., "GoPro Telemetry track" indicating to a media player that the subsequent information in the track comprises metadata.

In some implementations, the metadata text track may be declared as the string of length 0. For a given subtitle, there a two byte field for the string length, followed by a NULL (0x00) terminated character string may be used. With a string length of zero, the remainder of the metadata payload may not parsed by subtitling players.

In some implementations, individual field of metadata may be configured to occupy its own custom track, with the telemetry's own timing information. The number of tracks corresponding to number of individual metadata fields may be allocated at record start; the sample rate for individual metadata streams may be available in advance (e.g., at the record start).

Information stored in the text track container may be utilized for determining accurate time describing when metadata samples occurred (e.g., similar to the MP4 indexes where video frames and audio sample are stored). The index payload may contain time relative to video track. In order to determine time of the individual samples within the metadata, per sample timing information may be stored as describe in detail below. In some implementations of metadata sampled at rates higher (e.g., accelerometer and/or gyro sampled at 1000 Hz) than these of the video track (e.g., 30-60 Hz), the number of sample per payload may be utilized in order to determine the original metadata clock rate. Accordingly, yet over an entire capture a very accurate extraction of metadata clock can be attained without the overhead of storing per sample timing information.

FIG. 1C illustrates one implementation of a generalized system for capturing and/or accessing multimedia content using methodology of the disclosure.

The system 180 of FIG. 1C may include a capture device 182 and a media storage entity 184 over link 188. In one or more implementations, the capture device 182 may correspond to an action camera, e.g., 170 described with respect to FIG. 1A. The media storage entity 184 may comprise a computing device (e.g., desktop, laptop computer), a network attached storage, a cloud storage entity (e.g., Amazon, GoPro Channel, YouTube), and/or another entity configured to receive and serve content. The capture device may be configured to transfer information (e.g., combined video/ metadata stream) to the entity 184 via link 188. The link 188 may be effectuated using any applicable connection technology, e.g., wired or wireless. In some implementations wherein the capture device may utilize a removable media (e.g., secure digital card), the transfer from the capture device to the media storage may be implemented by plugging in the removable media into a component (e.g., secure digital card reader) of the media storage entity. The system 180 of FIG. 1C may include a client device 186 in operable communication with a media storage entity 190 over link 188. The link 190 may be effectuated using any applicable connection technology, e.g., wired or wireless. In some implementations media storage entity and the client device may be embodied within a given computerized apparatus (e.g., desktop, laptop, tablet computer). One implementation of operation of the system 180 is described in detail with respect to FIG. 8, below.

FIGS. 6-9 illustrate methods 600, 700, 800, 900 for combining video and metadata using implementations of the present disclosure. The operations of methods 600, 700, 800, 900 presented below are intended to be illustrative. In some implementations, method 600, 700, 800, 900 may be accomplished with one or more additional operations not described, and/or without one or more of the operations discussed. Additionally, the order in which the operations of method 600, 700, 800, 900 are illustrated in FIGS. 6-9 and described below is not intended to be limiting.

In some implementations, methods 600, 700, 800, 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600, 700, 800, 900 in response to instructions stored electronically on an electronic storage medium. The one or more processing devices may include one or more devices configured through hardware, firmware, and/or software to be specifically designed for execution of one or more of the operations of methods 600, 700, 800, 900.

Figure 6:
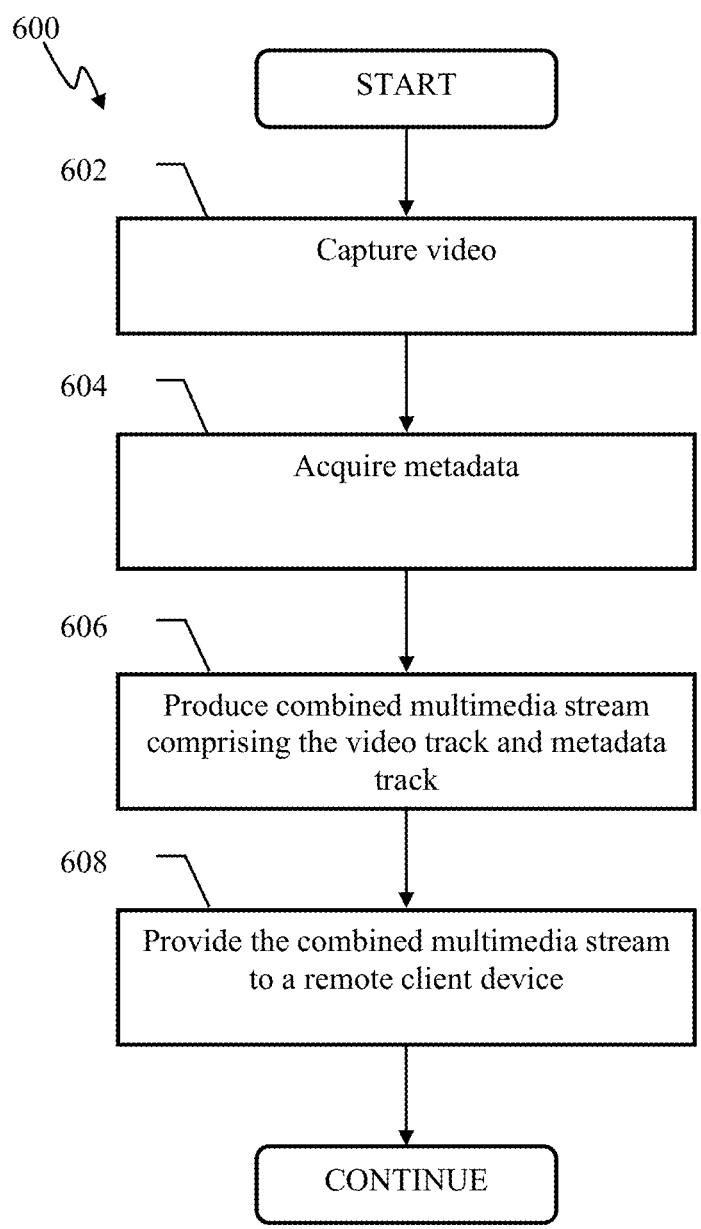
FIG. 6 is a logical flow diagram illustrating a method of producing a multimedia stream comprising video and metadata for streaming implementations of the present disclosure.

FIG. 6 is a logical flow diagram illustrating a method of producing a multimedia stream comprising video and metadata for streaming implementations of the present disclosure.

At operation 602 of method 600 video track may be captured. In some implementations, the video track capture may be performed by a capture device, e.g., 170 of FIG. 1A and/or 130 of FIG. 1B configured to capture video of an activity by a user (e.g., downhill skiing).

At operation 604 of method 600 metadata may be acquired. In some implementation, the metadata may correspond to information produced by one or more sensors embodied with the capture device (e.g., IMU sensor embedded within the capture device 130 of FIG. 1B). In one or more implementations, the metadata may correspond to information produced by one or more entities external with respect to the capture device (e.g., heart rate monitor 154 location information provided by the user device 160 and/or external GPS receiver 152 in FIG. 1A and/or another external device in operable communications with the capture device).

At operation 606 combined multimedia stream comprising the video track and metadata may be produced. In some implementations, the combined stream may be produced by a component embodied within the capture device (e.g., the component 500 of FIG. 5A embodied within the device 130 of FIG. 1B).

At operation 608 the combined multimedia stream may be provided to a remote client device. In one or more implementation, wherein the capture device may be in direct communication with the client device (e.g., mobile device 160 in FIG. 1A), the combined multimedia stream may be communicated to the client device via a direct link. In some implementation, the combined multimedia stream may be communicated to the mobile device via one or more intermediary entities (e.g., via 4G cellular network, a server (e.g., to store at Dropbox, Amazon, and/or other cloud storage)).

In one or more implementations wherein the video obtained at operation 602 may be communicated to an entity remote from the capture device (e.g., via link 158 to remote device 160 of FIG. 1A), the combined stream of operation 606 may be produced by a component and/or a process operable on the remote device (e.g., a software application operated by the remote device 160 of FIG. 1A).

Figure 7:
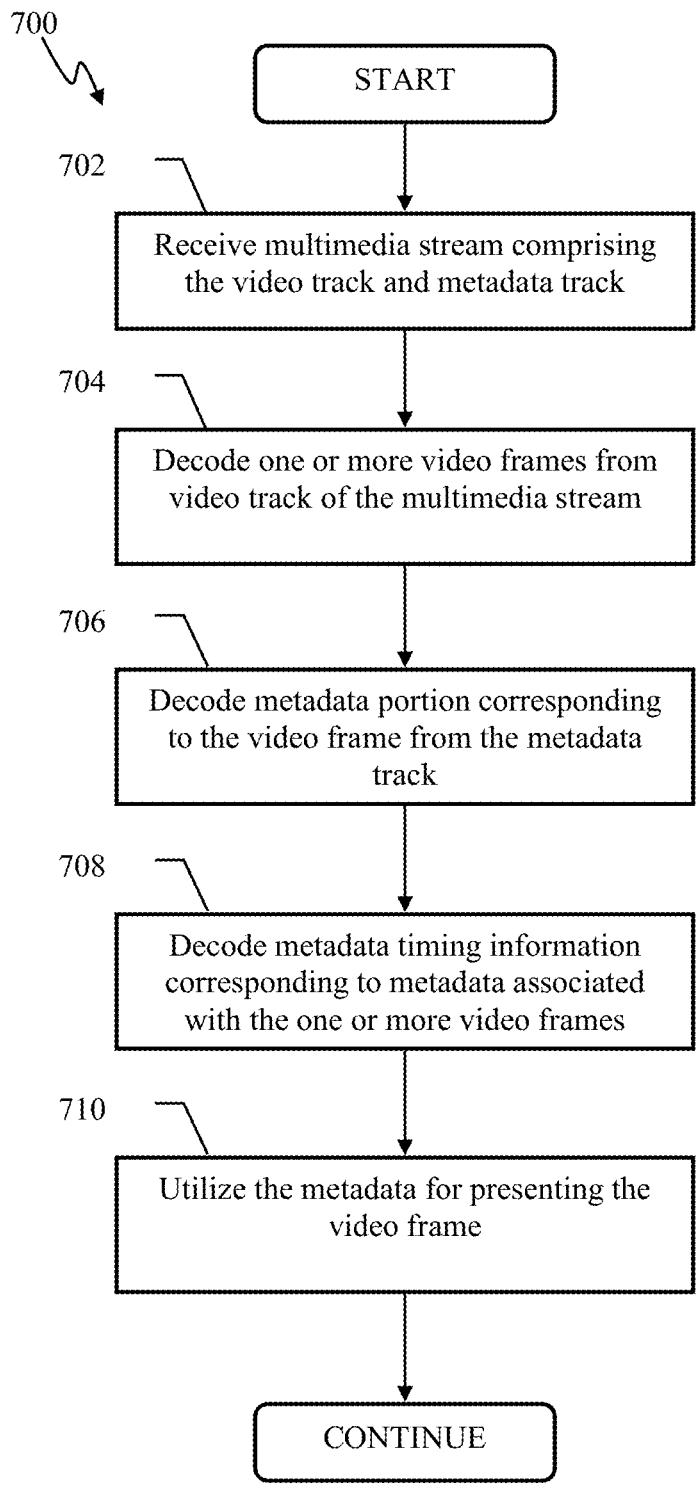
FIG. 7 is a logical flow diagram illustrating a method of utilizing metadata information encoded in a multimedia stream comprising video and metadata in accordance with one implementation.

FIG. 7 illustrates a method of utilizing metadata information encoded in a multimedia stream comprising video and metadata in accordance with one implementation.

At operation 702 of method 700 multimedia stream comprising video track and metadata track may be received. In some implementations, the multimedia stream may be received by a mobile client device (e.g., 160), a media device (e.g., smart TV, media server), client computing device (e.g., desktop, laptop) and/or other device capable of receiving and/or displaying video and/or other information.

At operation 704 one or more video frames from video track of the multimedia stream may be decoded. In some implementations, the one or more frames may correspond to a highlight moment in time associated with the capture operation of, e.g., 602 of FIG. 6. The highlight moment may be produced by a user using, e.g., a button provided by the capture device, a user interface element provided by the client device (e.g., soft button in an application), and/or produces automatically based on analysis of one or more sensory parameters (e.g., sound level, acceleration, and/or other). The highlight moment may indicate timing of a jump during downhill descent.

At operation 706 metadata portion corresponding to time period covering duration of one or more video frames decoded at operation 704 may be decoded from the metadata track. In some implementations, decoding operation may comprise steps described with respect to FIG. 9.

At operation 708 metadata timing information corresponding to metadata associated with the one or more video frames may be decoded. In some implementations, the metadata timing decoding may be configured based on decoding one or more TIMG records, e.g., such as described with respect to Listing 9 elsewhere. In one or more implementations, timing may be determined by extracting a clock through the number of samples present in the payload(s).

At operation 710 the metadata for presenting the video frame may be utilized. By way of an illustration, camera position, elevation, acceleration, speed, and/or other parameter may be presented with the video.

Figure 8:
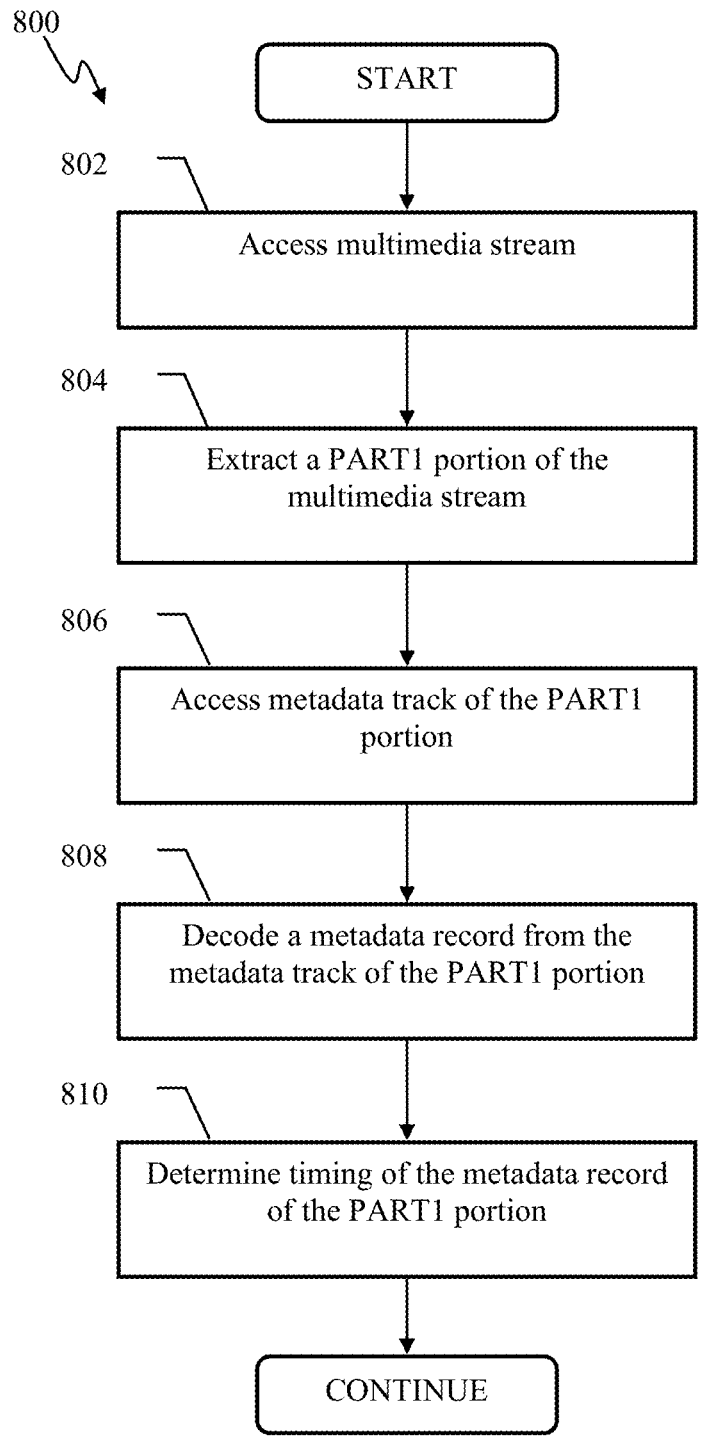
FIG. 8 is a logical flow diagram illustrating a method of accessing metadata from a portion of the multimedia stream comprising video and metadata in accordance with one or more implementations.

FIG. 8 illustrates method of accessing metadata from a portion of the multimedia stream comprising video and metadata in accordance with one or more implementations.

At operation 802 of method 800 multimedia stream may be accessed. In some implementations, the multimedia stream access may correspond to receipt of the multimedia stream by a client device, reading a multimedia file (e.g., MP4, MOV) from a media server, e.g., Amazon, iTunes, Dropbox, cable television network node, network attached storage device, and/or other source. In some implementations, multimedia stream access may be effectuated by client device 186 of FIG. 1C.

At operation 804 a portion of the multimedia stream may be extracted. Such portion may be referred to as the PART1. In some implementations a user may wish to break up captured stream and/or recorded file and/or to read certain portions of the file. In order to display metadata contemporaneously with the video, the display process may access the metadata and the timing of the metadata corresponding to the PART1 portion without necessitating reading of the preceding portion of the stream/file. By way of an illustration, during lossless file trimming, a 100 MB of a 4 GB capture may be transferred to a smart phone, or extracted before storage for later editing. Using metadata storage and/or formatting methodology of the disclosure, metadata associated with the video of the extracted portion may be available within the portion for further use.

At operation 806 metadata track of the PART1 portion may be accessed. In some implementations, wherein the metadata may be stored in one or more text tracks the respective text track may be accessed. In some implementations, wherein the metadata may be stored in a dedicated metadata track, the dedicated metadata tracks may be accessed.

At operation 808 a metadata record in metadata track of the PART1 portion may be accessed. In some implementations, the metadata field access may comprise one or more operations described with respect to FIGS. 4A-4C and/or FIG. 9. Referring now to FIG. 4B, metadata field access may comprise decoding of the 32 bit tagID 462, 8-bit typeID 452 value, field size 454 value, 16-bit MetadataItemRepeat 456 value denoting number of metadata elements (items) in the metadata record, and/or other operations.

At operation 810 timing of the metadata record of the PART1 portion may be determined. In some implementations, metadata record timing may be determined using timing of the video track, field using video track of the PART1 portion. Metadata timing payload (e.g., TIMG described with respect to listing 9) may be utilized in order to, e.g., adjust a delay between the metadata and the video information.

Figure 9:
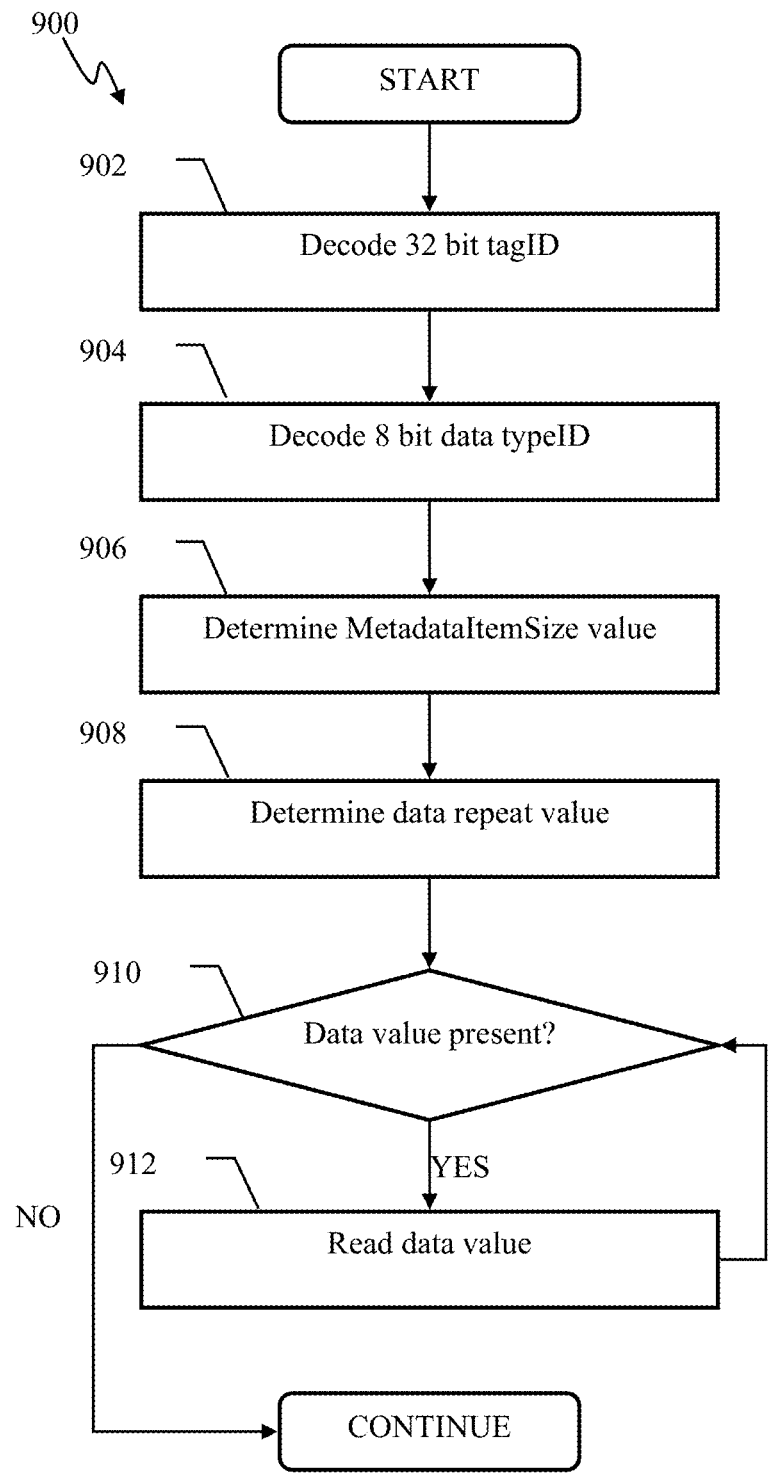
FIG. 9 is a logical flow diagram illustrating a method of decoding metadata payload from a multimedia stream comprising video and metadata tracks in accordance with one or more implementations of the present disclosure.

FIG. 9 is a logical flow diagram illustrating a method of decoding metadata payload from a multimedia stream comprising video and metadata tracks in accordance with one or more implementations of the present disclosure.

At operation 902 of method 900 32 bit tagID field may be decoded. In some implementations, the tagID decoding may comprise comparing string value corresponding to 32-bits to one or more entries within a reference table (e.g., such as illustrated in column 2 of Table 3).

At operation 904 8 bit typeID field may be decoded. In one or more implementations the decoding of operation 904 may include comparison of the byte value to one or more values in a typeID table (e.g., such as illustrated in Listing 2).

At operation 906 MetadataItemSize field value may be determined. By way of an illustration, the MetadataItemSize 454 of FIG. 4B may correspond to 4 bytes for a floating point metadata payload.

At operation 908 metadata repeat value may be determined. By way of an illustration, MetadataItemRepeat field 456 may contain 0 for no repeat (single value). In some implementations, numbering may begin with zero so that no repeat may correspond to the MetadataItemRepeat value of 1.

At operation 910 a determination may be made as to whether information value may be present in the metadata record.

Responsive to a determination at operation 910 that the information value may be present, the method 900 may proceed to operation 912 wherein the information value may be read. The metadata format described herein may advantageously enable parsing and/or decoding of metadata values within the metadata record based on decoding the typeID field of the metadata record.

Metadata formatting and/or storage methodology of the present disclosure may advantageously enable streaming of multimedia containing video and/or audio information and metadata. In some implementations, embedding metadata along side with the video may enable partitioning (lossless trim) of a larger capture into smaller portion(s) and storing and/or transmitting one or more a smaller portions. By way of an illustration, upon reviewing captured footage of downhill skiing, a given portion of the footage (e.g., jump) may be identified. Using the combined metadata/video track, information associated with the jump may be provided to, e.g., video sharing application (e.g., GoPro channel), and/or stored for subsequent editing/viewing. In some implementations, sticky metadata approach may be employed when handling metadata from sources that may be subject to dropouts (e.g., such as heart rate monitor 154 and/or GPS receiver 152 that may be communicating via Bluetooth with the camera 170). Metadata device (source) may be declared as "sticky", e.g., as shown in Listing 12. When a dropout occur for metadata device declared as sticky, a previous metadata payload value may be utilized for one or more subsequent payloads until updated information may arrive from the metadata device. By way of an illustration with respect to FIG. 13, GPS device metadata may be declared as sticky; payload values 14 through 18 may repeat value of payload 13. Metadata formatting methodology described herein may enable a human operator to quickly preview multimedia stream in order to determine metadata content without requiring dedicated software. By way of an illustration, an operator may utilize, e.g., a Hexadecimal editor to view contents of a multimedia file. By analyzing file contents, e.g., as shown in FIG. 12, the operator may determine that contrast and exposure metadata may be present in the file as indicated by tags CTRS, EXPS, WBAL in FIG. 12.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-eventrepresentation (AER) connection, or other type of communication topology used for accessing, e.g., different memories in a system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLABT™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and/or other machine code implementations.

As used herein, the terms "connection", "link", "transmission channel", "delay line", "wireless" means a causal link between any two or more entities (whether physical or logical/virtual), which enables information exchange between the entities.

As used herein, the terms "GoPro action camera", "GoPro actioncam" may be used to describe one or more of existing and/or future models of action cameras provided by GoPro, Inc., e.g., including but not limited, to HERO4 Black, HERO4 Silver, HERO4 Session, HERO, HERO+LCD, HERO3, HERO3+, HERO3+Silver, and/or other models.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital information including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet, and/or other invisible ranges).

It will be recognized that while certain aspects of the technology are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the technology. The scope of the disclosure should be determined with reference to the claims.

What is claimed is:

1. A computerized capture system for obtaining a multimedia streaming file, the system comprising:
   an imaging sensor configured to generate output signals conveying a series of images;
   a sensor interface configured to obtain information from one or more sensors other than the imaging sensor, the obtained information being relevant to one or more images within the series of images, the one or more sensors other than the imaging sensor including a first sensor;

information storage configured to store a collection of potential sensor tags; and a processor configured to:
generate an encoded video track that includes images from the series of images;
generate a sensor track that includes a first sensor record containing the obtained information;
generate a combined multimedia stream comprised of the encoded video track and the sensor track; and
store the combined multimedia stream in the information storage;

wherein:
the first sensor record comprises:
a header portion comprising a 32 bit tag field comprising a sensor tag selected from the potential sensor tags, the sensor tag identifying type of the obtained information;
a 32 bit type size field comprising an 8 bit value type field identifying a value type of a given value of the obtained information that is within the first sensor record; an 8 bit item size field indicating size of the given value of the obtained information that is within the first sensor record; and a 16 bit repeat field indicating a number of values of the obtained information that is within the first sensor record; and
a data portion comprising the values of the obtained information; and
wherein individual ones of the values of the obtained information correspond temporally to specific ones of the one or more images in the series of images.

2. The system of claim 1, wherein the obtained information comprises a parameter characterizing the imaging sensor during generation of the series of images.

3. The system of claim 2, wherein the parameter is selected from the group consisting of white balance, imaging sensor temperature, shutter speed, contrast parameter, imaging sensor gain, and saturation.

4. The system of claim 1, wherein:
individual values of the number of values of the obtained information within the first sensor record correspond temporally to one or more images in a first portion of the series of images, the first portion corresponding to a first time window;
the sensor track comprises a second sensor record comprising a number of values of the obtained information, individual ones of the number of values within the second sensor record correspond temporally to one or more images in a second portion of the series of images, the second portion corresponding to a second time window; and
the first time window is configured subsequent to and non-overlapping/spaced from the second time window.

5. The system of claim 4, wherein:
descriptions of the header portion comprising 32 bit type size field, and the data portion cooperate to characterize track format of the sensor track, the track format configured to enable an access of the sensor track with the second time window based on reading the second portion of the series of images within the combined multimedia stream and without reading of the first portion of the series of images within the combined multimedia stream.

6. The system of claim 4, further comprising:
a communications interface configured to enable communication of at least a first portion of the combined multimedia stream, the first portion of the combined multimedia stream comprising the first sensor record and the first portion of the series of images;
wherein:
the first sensor record comprises first sensor information portion characterizing at least one aspect of the imaging sensor within the first time window, the second sensor record comprises second sensor information portion characterizing the at least one aspect of the imaging sensor within the second time window; and
communication of the first portion of the combined multimedia stream in absence of the communication of a second portion of the combined multimedia stream is configured to provide information related to the at least one aspect of the imaging sensor during the first time window.

7. The system of claim 6, wherein the aspect comprises one or more of the imaging sensor motion, the imaging sensor orientation, and the imaging sensor position.

8. The system of claim 6, further comprising:
a sensor coupled to the sensor interface, the sensor configured to provide the obtained information comprising one or more of the imaging sensor motion, the imaging sensor orientation, and the imaging sensor position; and
a housing configured to enclose the processor, the information storage, and the sensor.

9. The system of claim 6, further comprising:
a housing configured to enclose the processor, and the information storage;
wherein the sensor interface comprises a wireless communications interface configured to receive data communication from a sensor disposed external to the housing, the data communication configured to convey the obtained information.

10. The system of claim 8, wherein:
the sensor comprises a gyroscope; and
and the header portion includes a four character code "GYRO".

11. The system of claim 8, wherein:
the sensor comprises an accelerometer; and
the header portion includes a four character code "ACCL".

12. The system of claim 8, wherein:
the sensor comprises a 6-axis inertial measurement unit; and
the header portion includes a four character code "IMU6".

13. The system of claim 8, wherein:
the sensor comprises an 9-axis inertial measurement unit; and
the header portion includes a four character code "IMU9".

14. The system of claim 8, wherein:
the sensor comprises a magnetic field sensor; and
the header portion includes a four character code "MAGN".

15. The system of claim 1, wherein generation of the combined multimedia stream is configured in accordance with a multimedia container format comprised of a video track and a text track;
the encoded video track being stored in the video track; and
the sensor track being stored in the text track.

16. The system of claim 15, wherein the multimedia container format is selected from the group consisting of the QuickTime multimedia container format and MPEG-4 Part 14 (MP4) digital multimedia format.

17. The system of claim 1, wherein the sensor tag comprises four character tag configured as case sensitive.

18. The system of claim 17, wherein a type portion of the sensor tag comprises a case sensitive character.

19. The system of claim 18, wherein the case sensitive character is selected from the list consisting of characters 'f', 's', 'c', 'l', 'b', 'B', 'F', 'h', and 'L'.

20. A non-transitory computer readable medium comprising a plurality of computer instructions configured to, when executed by a processor, decode sensor information from a multimedia stream by at least:
    accessing one or more image frames from a video track of the multimedia stream, the one or more frames corresponding to a time interval;
    accessing a text track of the multimedia stream corresponding to the time interval, the accessing the text track comprises steps of:
        reading from the text track a 32-bit sensor tag field value;
        accessing a data store configured to store multiple sensor tags;
        identifying within the data store an entry corresponding to the sensor tag field value, the entry configured to identify one or more of type, origin, and/or meaning of the sensor information;
        reading from the text track a 32 bit type size field comprising 8 bit type portion configured to identify type of a given value of the sensor information within a sensor record; 8 bit item size field indicating size of the given value of the sensor information; and 16 bit repeat field indicating a number of values of the sensor information within the sensor record; and
        reading from a data portion comprising the number of values of the sensor information;
wherein:
    individual values of the number of values of the sensor information correspond temporally to the one or more images; and
    the sensor tag field, the type size field and the data portion are configured to form the sensor record, the sensor record being stored in the text track.

\* \* \* \* \*